United States Patent
Ikezawa et al.

(10) Patent No.: US 7,155,424 B2
(45) Date of Patent: *Dec. 26, 2006

(54) SALES MANAGEMENT SYSTEM AND METHOD THEREOF

(75) Inventors: Toyoji Ikezawa, Kanagawa (JP); Masao Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 375 days.

This patent is subject to a terminal disclaimer.

(21) Appl. No.: 09/964,585

(22) Filed: Sep. 28, 2001

(65) Prior Publication Data

US 2002/0040358 A1    Apr. 4, 2002

(30) Foreign Application Priority Data

Sep. 29, 2000    (JP)    ............... 2000-299945

(51) Int. Cl.
*G06F 17/30*    (2006.01)

(52) U.S. Cl. ......................................................... 707/1

(58) Field of Classification Search ................ 707/1, 707/104.1, 3, 200; 705/80, 14, 17, 21, 34, 705/26, 10; 235/375, 385; 379/379, 380; 345/751, 700

See application file for complete search history.

(56) References Cited

U.S. PATENT DOCUMENTS

| | | | | |
|---|---|---|---|---|
| 4,839,829 | A * | 6/1989 | Freedman | 345/751 |
| 6,338,050 | B1 * | 1/2002 | Conklin et al. | 705/80 |
| 6,820,060 | B1 * | 11/2004 | Eisner | 705/10 |
| 2002/0103731 | A1 * | 8/2002 | Barnard et al. | 705/34 |
| 2003/0107587 | A1 * | 6/2003 | Maritzen et al. | 345/700 |

FOREIGN PATENT DOCUMENTS

| | | |
|---|---|---|
| JP | 07-230442 | 8/1995 |
| JP | 9-6838 | 1/1997 |
| JP | 9-160979 | 6/1997 |
| JP | 10-011498 | 1/1998 |
| JP | 2000-222486 | 8/2000 |
| JP | 2000-242724 | 9/2000 |
| JP | 2001-250022 | 9/2001 |

OTHER PUBLICATIONS

U.S. Appl. No. 09/986,908, filed Nov. 13, 2001.

* cited by examiner

*Primary Examiner*—E P LeRoux
(74) *Attorney, Agent, or Firm*—Oblon, Spivak, McClelland, Maier & Neustadt, P.C.

(57) ABSTRACT

An SFA (Sales Force Automation) server stores a customer database. The customer database stores: a customer name and/or staff name of corresponding customer; a business transaction of the customer; detail information representing business activities for achieving the business transaction, a completion scheduled date, and an actual completion date; information for determining whether each maturity stage has been attained; a check flag representing whether a maturity item has been attained, and a strategic scenario showing some plans for the business transaction toward the customer. Each ef-sales-staff terminal inputs the above-data, stores the input data, and displays the detail information of the business activities in chronological order of the scheduled dates in the form of a list. The displayed data can be viewed from a manager terminal as well. An SCM (Supply Chain Management) server estimates the-demand for products, based on the check flag stored in the customer database.

14 Claims, 14 Drawing Sheets

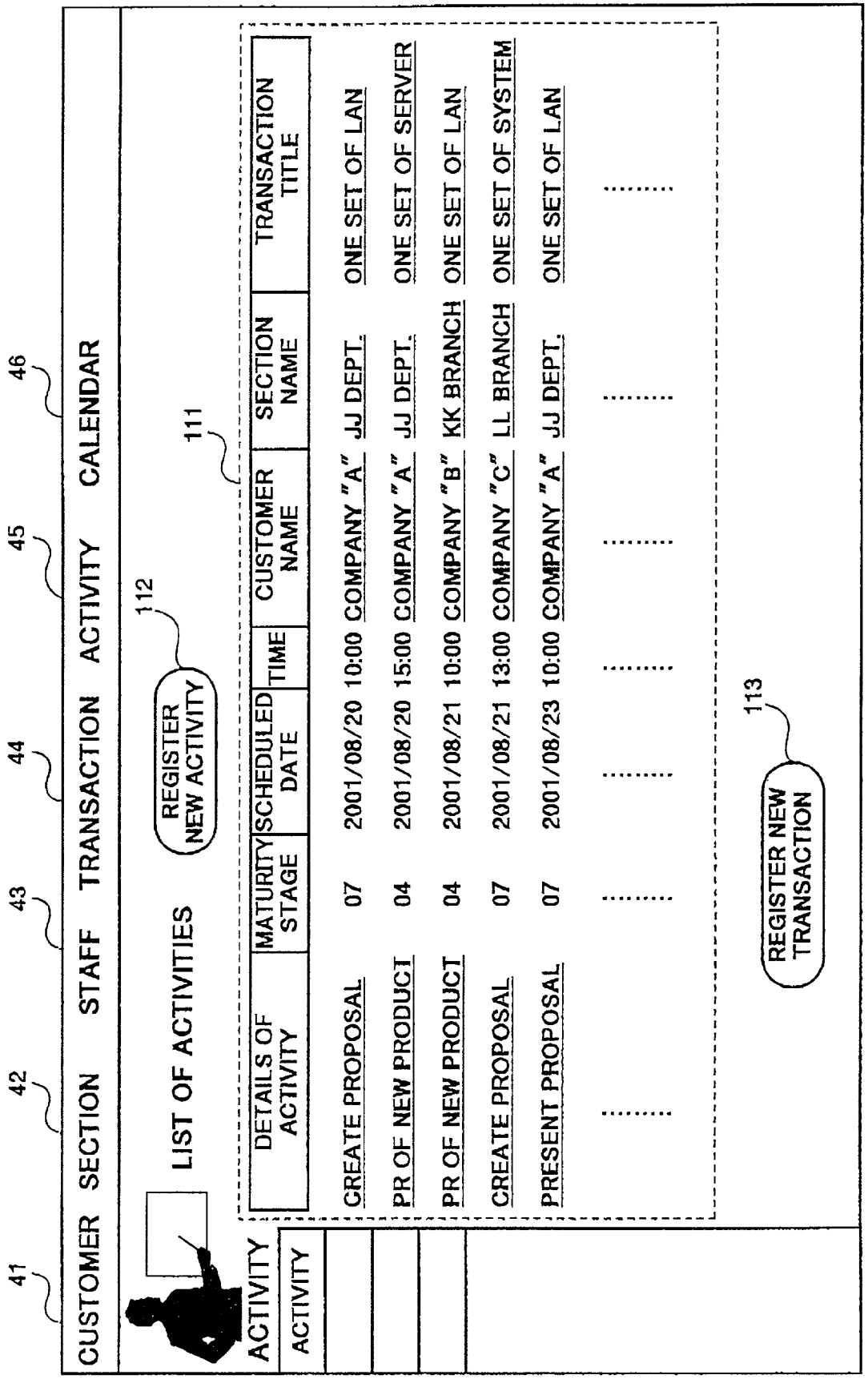

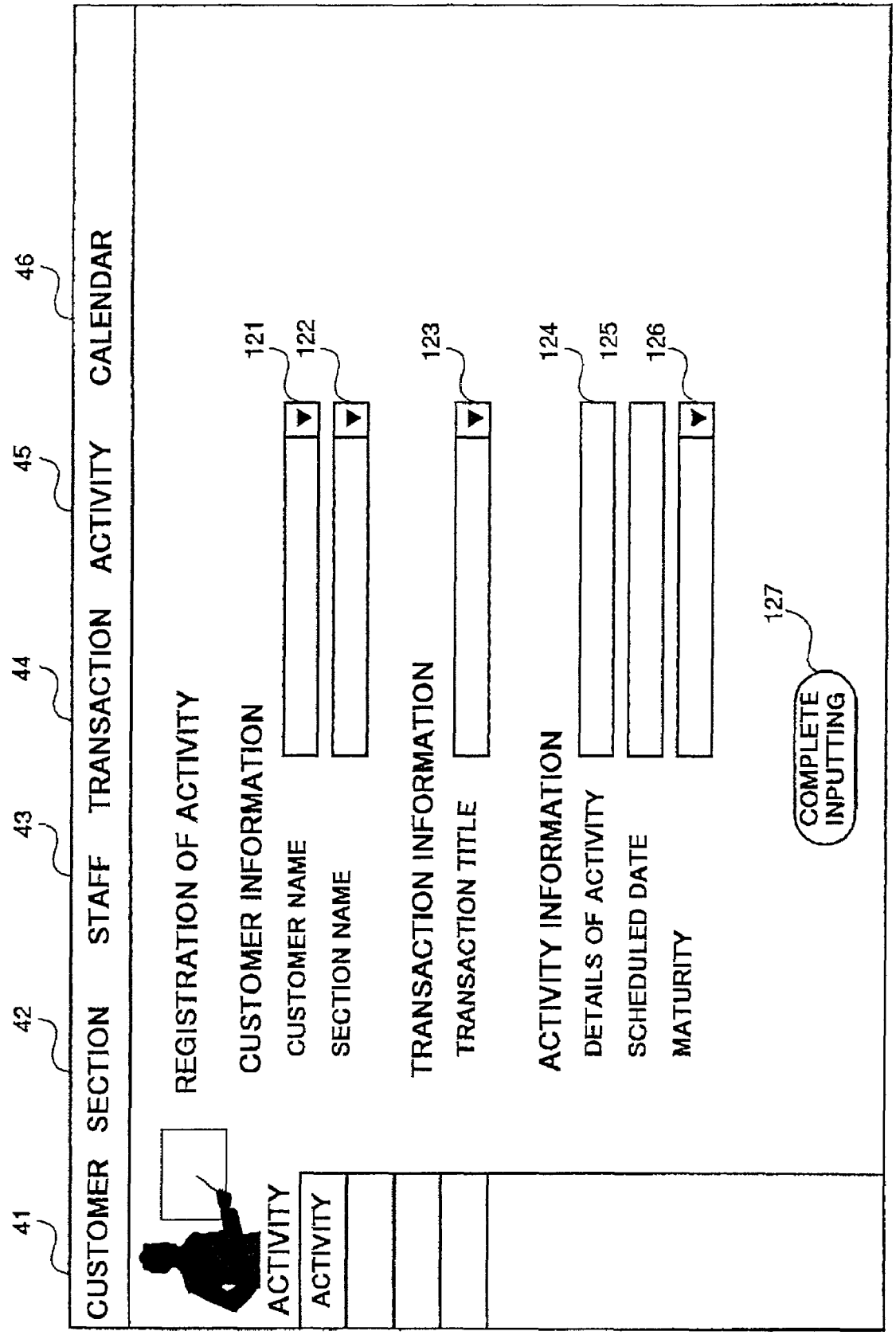

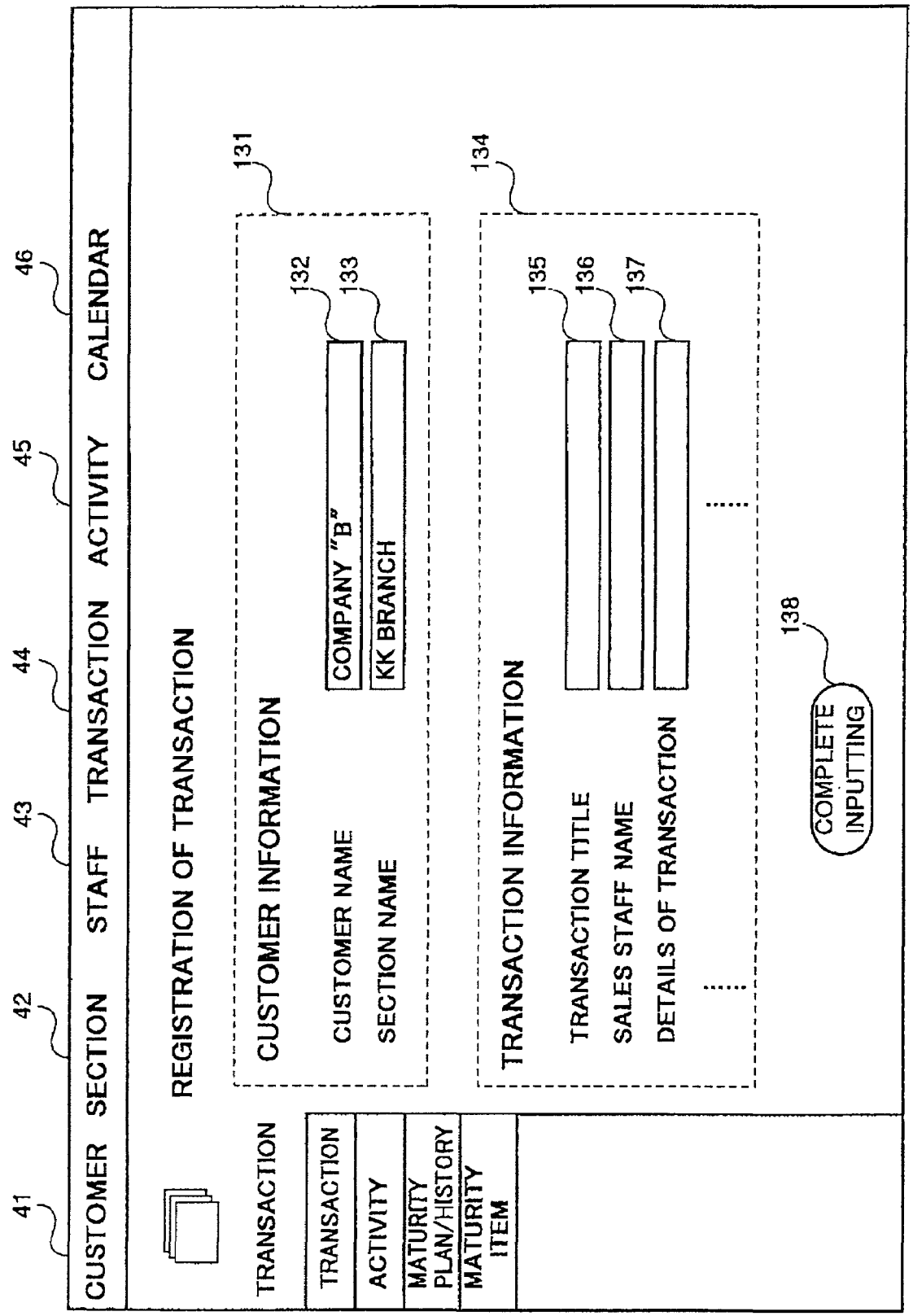

FIG. 14

CUSTOMER   SECTION   STAFF   TRANSACTION   ACTIVITY   CALENDAR

CALENDAR

MONTHLY CALENDAR

SALES STAFF NAME ▼ — 141

AUGUST 2001

| MON | TUE | WED | THURS | FRI | SAT/SUN |
|---|---|---|---|---|---|
| 30 | 31 | 1 | 2 | 3 | 4/5 |
| 6 | 7 | 8 | 9 | 10 | 11/12 |
| 13 | 14 | 15 | 16 | 17 | 18/19 |
| 20<br>9:00 REGULAR MEETING<br>10:00 "A"/LAN-<br>CREATE PROPOSAL<br>15:00 "A"/SERVER-PR<br>FOR NEW PRODUCTS | 21<br>10:00 "B"/LAN-PR FOR<br>NEW PRODUCTS<br>13:00 "C"/SYSTEM-<br>CREATE PROPOSAL | 22 | 23<br>10:00 "A"/LAN-<br>PRESENT PROPOSAL | 24 | 25/26 |
| 27 | 28 | 29 | 30 | 31 | 1/2 |

DAILY
WEEKLY
MONTHLY — 142
ACTIVITY

US 7,155,424 B2

SALES MANAGEMENT SYSTEM AND METHOD THEREOF

CROSS REFERENCE TO RELATED APPLICATIONS

The present application claims priority to Japanese Application 2000-299945, filed on Sep. 29, 2000, the entire contents of which is incorporated by reference.

BACKGROUND OF THE INVENTION

1. Field of the Invention

The present invention relates to a sales management system and method for managing sales activities.

2. Description of the Related Art

The performance (result) of sales activities for achieving a business deal has greatly been depended upon the individual sales skills of or human relations established by the sales staff of an organization (company, corporation, enterprise, etc.). The effects of the sales activities, progress or progress status of a target business transaction have been subjectively evaluated, based on the experiences of the individual sales staffs.

Conventionally, it is very difficult to find out any necessary factor(s) for enhancing the success percentage of the business activities (visiting customers, explaining about target products, and such) just by oneself. At the same time, it is very difficult to acquire the sales skills just by oneself as well. To improve business performance, a large number of sales persons handle a number of business activities to improve their business results. That is, the sales persons try to improve their business performance using an inefficient technique.

Further, there are no guidelines, based on which the Manager of the sales section at the organization objectively evaluates the contents of activities done by the sales person, the progress or progress status of a target business transaction to be dealt. Hence, it is very difficult for the manager to understand the progress or progress status of the business transaction within a short time and to appropriately instruct the sales person in charge of the transaction to have better business performance.

SUMMARY OF THE INVENTION

The present invention has been made in consideration of the above. It is accordingly an object of the present invention to provide a sales management system and its method, for enabling to perform sales activities with high efficiency, without depending on the personal skills of sales persons.

Another object thereof is to provide a sales management system and its method, for enabling a manager of a sales section to objectively evaluate the contents of activities done by sales persons of the sales section and the progress or progress status of a target business transaction to be dealt, and enabling the manager to appropriately instruct the sales persons to perform better business performance.

In order to attain the above objects, according to the first aspect of the present invention, there is provided a method for managing sales activities, the method comprising the steps of:

storing, in a database, a plurality of activity item information sets respectively representing each of a plurality of sales activity items included in sales activities for achieving a business transaction, in association with each of a plurality of stages according to which the plurality of sales activity items are classified based on progress of the business transaction;

retrieving one or more activity item information sets stored in the database, in response to an instruction from an operator of a terminal; and controlling a display device of the terminal to display both of the one or more retrieved activity information sets and information representing one of the plurality of stages which corresponds to the one or more activity information sets.

According to the above method, the progress status of the sales activities can be managed by stage. Therefore, the sales activities can be done with high efficiency, without depending on the personal skills of the business performance.

The method may further include the step of storing, in the database, activity item evaluation information representing whether each of the plurality of activity items has been attained, in association with each of the plurality of activity item information sets.

According to the above method, the progress status of the sales activities can objectively be examined with ease.

The method may further include the step of controlling the display device of the terminal to display the one or more activity item information sets in association with the activity item evaluation information, by stage.

The method may further include the step of storing, in the database, in a case where the activity item evaluation information represents that each of the activity items each associated with one of the plurality of stages has been attained, stage completion information representing that the one of the plurality of stages has been completed.

The method may further include the step of storing, in the database, information representing a completion scheduled date of each of the plurality of stages.

The method may further include the step of storing, in the database, in a case where the activity item evaluation information represents that one of the activity items each corresponding to one of the stages has not yet been attained even after the completion scheduled date has passed, information representing that the business transaction is delayed at one of the plurality of stages.

The method may further include the step of displaying information representing the completion scheduled date of each of the stages and information representing an attainment status of each of the stages, in association with each of the stages, and wherein the information representing the attainment status represents in a case where at least one activity item information set represents that one of the activity items each corresponding to one of the stages has not yet been attained, that the business transaction is being delayed at one of the plurality of stages, and in a case where the activity item information sets respectively represent that the activity items each corresponding to one of the stages have been attained, that the one of the plurality of stages has been completed.

The method may further comprise the step of controlling the display device of tile terminal to display a message for suggesting the operator to change an action of the activity item evaluation information representing that one of the activity items has not yet been attained, when changing the activity item evaluation information corresponding to one of the activity items in association with a first stage of the plurality of stages so as to represent that the one of the activity items has been attained, in a case where the activity item evaluation information represents that one of the activity items corresponding to a second stage of the plurality of stages where the business transaction has been, progressed to a level lower than a level of progression at the first stage has not yet been attained.

The method may further include the step of storing, in the database, the activity item information sets in association with information representing the business transaction, according to each target business transaction having business activities including the activity items shown in the activity item information.

The method may further include the step of storing, in the database, a scenario of the sales activities toward a customer of each target business transaction, in association with information representing the customer.

In order to achieve the above objects, according to the second aspect of the present invention, there is provided a sales-activity management system comprising:

a processor which executes a process for managing sales activities;

a storage section which stores information necessary for executing the process; and a timer which supplies the processor with time information, and wherein the processor stores, in a database, a plurality of activity item, information sets respectively representing a plurality of activity items included in the sales activities performed for achieving a business transaction, in association with each of a plurality of stages according to which the plurality of sales activities are classified based on progress of the business transaction, retrieving one or more activity item information sets of the plurality of activity item information sets stored in the database, in response to an instruction from an operator of a terminal, and controlling a display device of the terminal to display both of the one or more retrieved activity information sets and information representing one of the plurality of stages which corresponds to the one or more activity information sets.

The database may be included in the memory unit, or may be prepared separately from the memory unit.

According to the above system, the progress status of the sales activities can be managed by stage. Therefore, the sales activities can be performed with high efficiency, without depending on the personal skills for business performance of sales persons.

The processor may further store, in the database, activity item evaluation information representing whether each of the plurality of activity items has been attained, in association with each of the activity item information sets.

The processor may control the display device of the terminal to display the one or more activity item information sets in association with the activity item evaluation information, by stage.

The processor may store, in the database, in a case where the activity item evaluation information represents that each of the activity items each associated with one of the plurality of stages has been attained, stage completion information representing that the one of the plurality of stages has been completed.

The processor may store, in the database, information representing a completion scheduled date of each of the plurality of stages.

In order to achieve the above objects, according to the third aspect of the present invention, there is provided a sales-activity management system comprising:

sales-activity-information storage means for storing. in a database, sales activity information regarding sales activities performed for achieving a business transaction;

sales-activity-information retrieval means for retrieving the sales activity information stored in the database; and sales-activity-information display means for displaying the retrieved sales activity information on a display device, and wherein the sales-activity-information storage means stores, in the database, activity item information representing the sales activities, in association with a plurality of stages according to which the sales activities are classified based on progress of the business transaction, the sales-activity-information retrieval means retrieves the activity item information stored in the database, in response to an instruction of an operator of a terminal, and the sales-activity-information display means sets the display device of the terminal to display the activity item information retrieved by the sales-activity-information retrieval means, in association with information representing each of the stages corresponding to the activity item information.

According to the above system, the progress status of the business activities can be managed by stage. Therefore, the business activities can be accomplished with high efficiency, without depending on the personal skills of sales persons.

In order to achieve the above objects, according to the fourth aspect of the present invention, there is provided a computer readable recording medium storing a program for controlling a computer to execute the steps of:

storing, in a database, a plurality of activity item information sets respectively representing each of a plurality of sales activity items included in sales activities for achieving a business transaction, in association with each of a plurality of stages according to which the plurality of sales activity items are classified based on progress of the business transaction;

retrieving one or more activity item information sets stored in. the database, in response to an instruction from an operator of a terminal; and controlling a display device of the terminal to display both of the one or more retrieved activity information sets and information representing one of the plurality of stages which corresponds to the one or more activity information sets.

According to the computer executing the above program, the progress status of the sales activities can be managed by stage. Thus, the sales activities can be done with high efficiency, without depending on the personal skills of sales persons.

The program may further control a computer to execute the step of storing activity item evaluation information representing whether each of the plurality of activity items has been attained, in association with each of the activity item information sets.

BRIEF DESCRIPTION OF THE DRAWINGS

These objects and other objects and advantages of the present invention will become more apparent upon reading of the following detailed description and the accompanying drawings in which:

FIG. 11 is a diagram showing an activity-list page to be displayed on the sales-staff terminal;

FIG. 12 is a diagram showing a new-activity registration page to be displayed on the sales-staff terminal;

FIG. 13 is a diagram showing a transaction registration page to be displayed on the sales-staff terminal; and FIG. 14 is a diagram showing a calendar page to be displayed on the sales-staff terminal.

DETAILED DESCRIPTION OF THE PREFERRED EMBODIMENT

A sales management method and sales management system according to an embodiment of this invention will now be explained. In this embodiment, explanations will now be made to an SFA (sales Force Automation) system for managing sales activities and manufacture processes for vending and manufacturing products by way of example.

Figure 1:
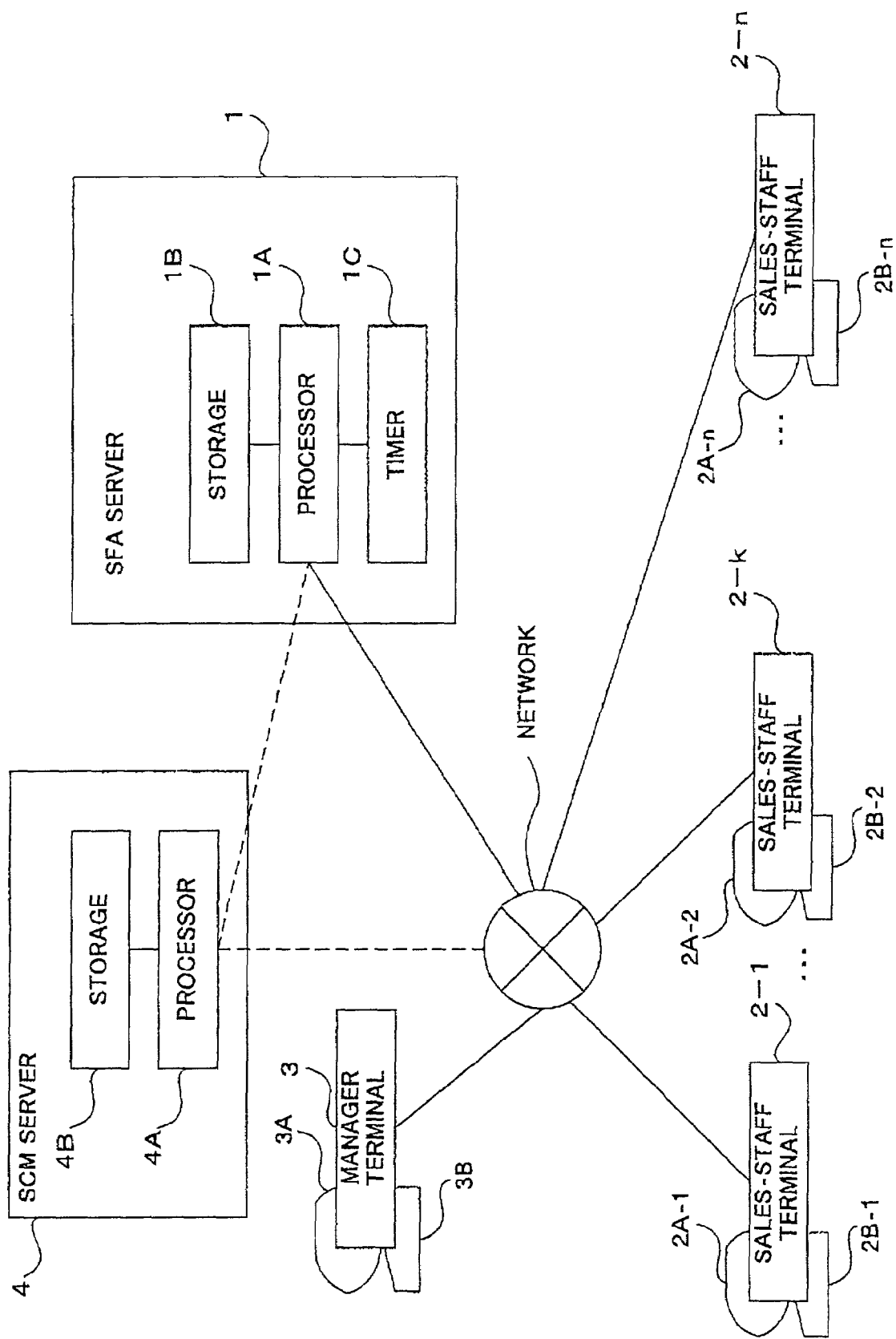
FIG. 1 is a diagram showing the structure of an SFA (Sales Force Automation) system according to an embodiment of this invention.

FIG. 1 is a diagram showing the structure of the SFA system according to an embodiment of the present invention. As shown in FIG. 1, the SFA system comprises an SFA server 1, a plurality of sales-staff terminals 2-1 to 2-n ("n" represents the total number of the sales-staff terminals), a manager terminal 3, and an SCM (Supply Chain Management) server 4.

The sales-staff terminals 2-1 to 2-n and the manager terminal 3 are connected to the SAF server 1 through an external network (e.g. the Internet, etc.). The SCM server 4 is connected to the SFA server 1 directly or through the external network.

The SFA server 1 comprises a processor 1A, a storage section 1B, and a timer 1C including a crystal oscillator and the like. The storage section 1B and the timer 1C are connected to the processor 1A. The processor 1A includes a CPU (Central Processing Unit) and the like, and carries out processes, as will be explained later. The timer 1C sequentially generates date/time information representing the present date and time.

Figure 2:
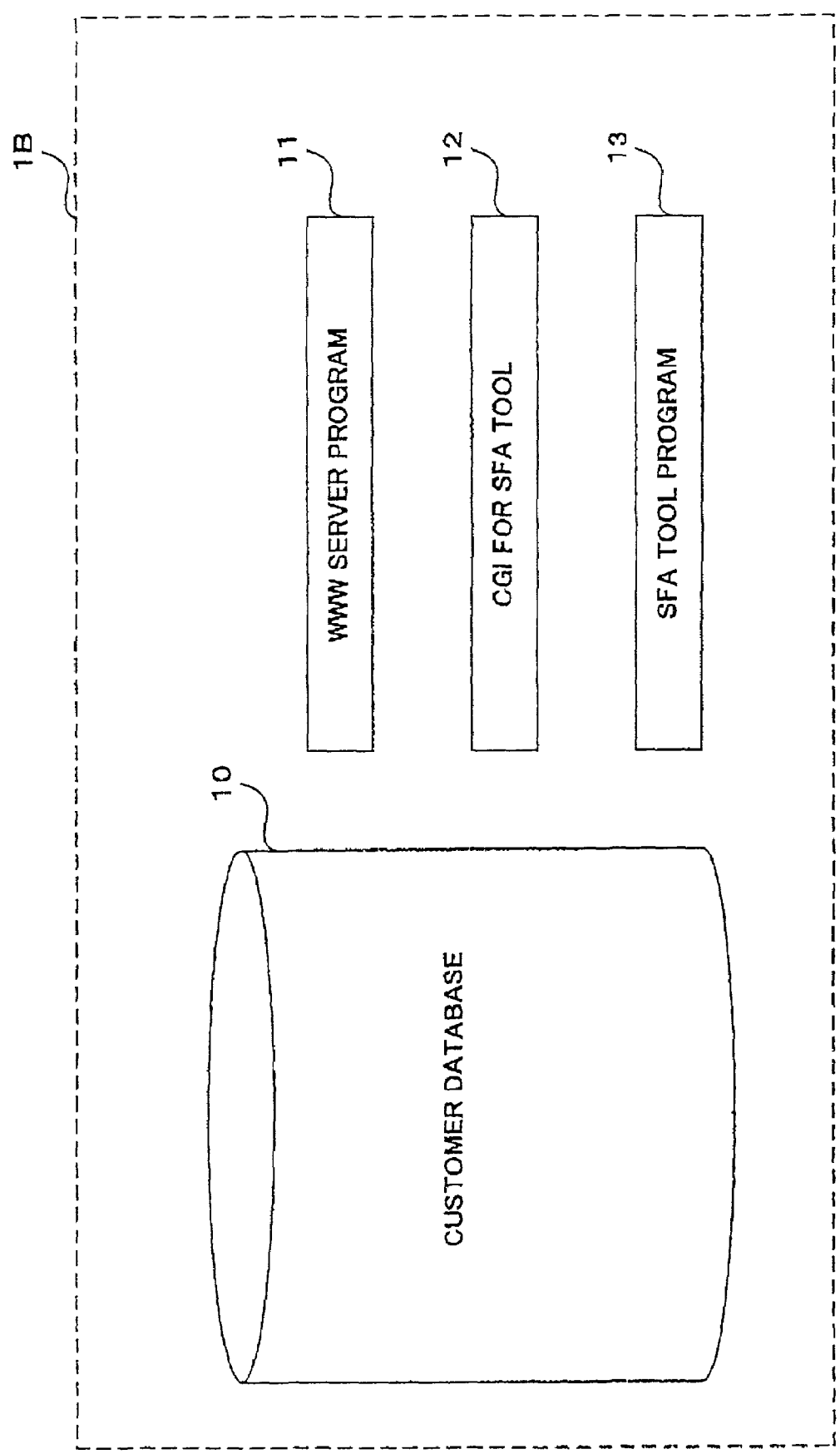
FIG. 2 is a diagram schematically showing the structure of data and programs stored in a storage section of an SFA server included in the SFA system of FIG. 1.

The storage section 1B includes a hard disk device or a RAM (Random Access Memory), etc. The storage section 1B stores, as illustrated in FIG. 2, a customer database 10, a WWW (World Wide Web) server program 11, a CGI (Common Gateway Interface) for SFA tool 12, and an SFA tool program 313.

The customer database 10 stores information regarding target customers of sales activities managed by this SFA system and information regarding the sales activities for the target activities. Such information are stored in advance in the storage section 1B, and updated in accordance with operations as will be explained later.

Figure 3:
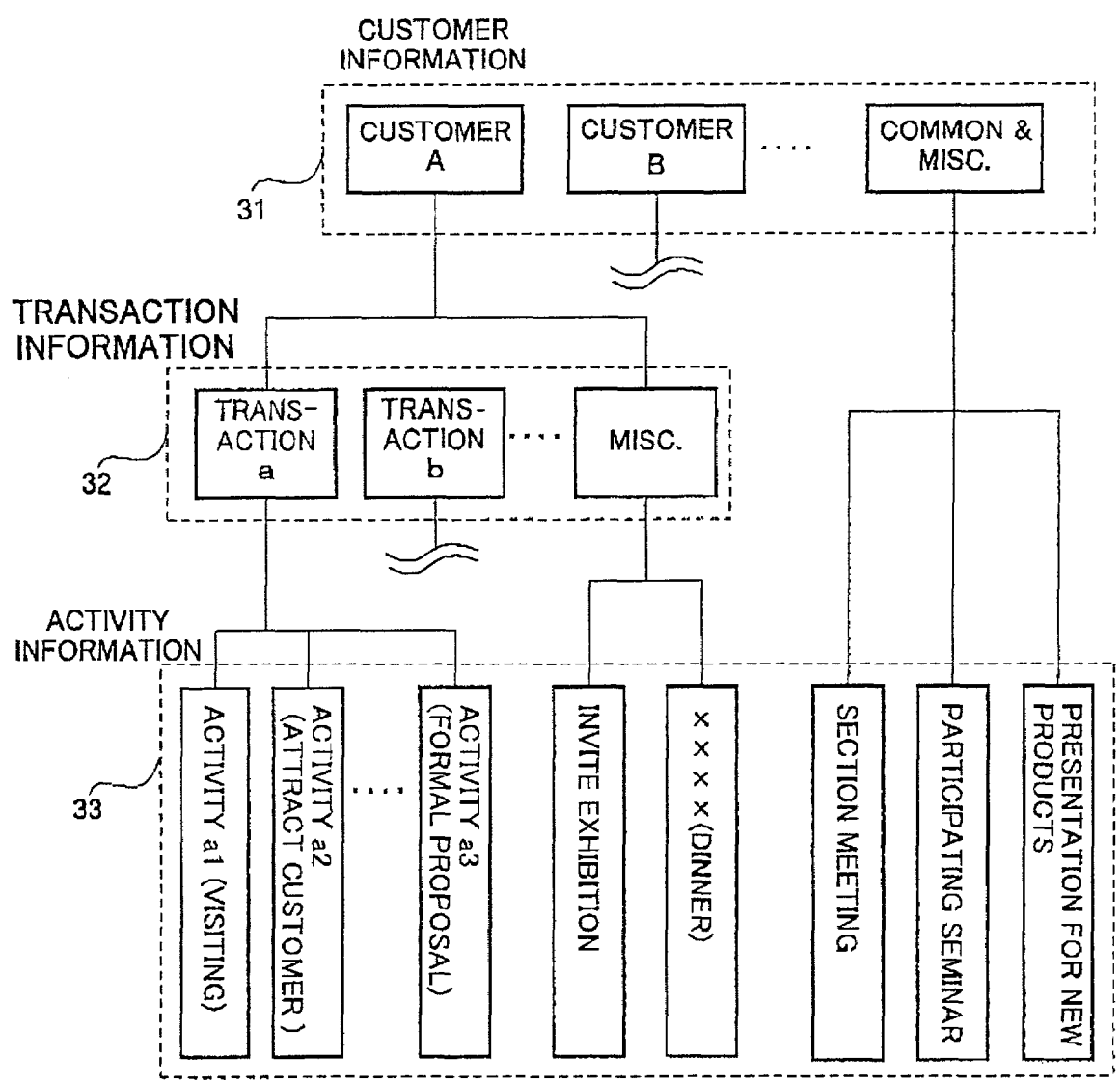
FIG. 3 is a diagram showing the logical data structure of information stored in a customer database shown in FIG. 2.

FIG. 3 is a diagram showing the logical data structure of the information stored in the customer database 10. Specifically, as shown in FIG. 3, stored in the customer database 10 are customer information 31 regarding customers, transaction information 32 representing transactions to be proceeded with corresponding customers, and activity information 33 representing activities for each transaction, in association with each other.

In the case where a customer represents a section of an organization (an enterprise, corporation, company, etc.,), the customer database 10 stores the following data items of: (A) this customer (organization) name; (B) a corresponding section name; (C) a name of a sales staff in charge of a corresponding business transaction in the section; (D) a phone number, facsimile number, or e-mail address of this staff; and (E) the post of this staff, in association with each other.

The customer database 10 stores information representing a transaction proceeded with this customer, in a manner corresponding to the customer information. Specifically, in association with the information of the above data items of (A), (B), and (C), the customer database 10 stores information (F) (a transaction title showing the scenario information of a corresponding transaction, a product code attached to a target product to be sold to this customer, a group of product codes to one of which the target product belongs) for identifying the contents of the corresponding transaction to be dealt with the customer. Note that information for specifically explaining the details of the corresponding transaction to be dealt with the customer may be added in a text format to the above information for identifying the details of the corresponding transaction.

Further, the customer database 10 stores information representing plans and results of the business activities for the transaction concerned, in a maimer corresponding to the above customer information and transaction information. Specifically, in association with the above information (F), the customer information 10 stores information (G) representing plans and results (maturity plan) of the business activities performed for the transaction concerned. The maturity plan shown in the information (G) is classified into the following nine stages (1) to (9), in accordance with an intermediate goal (hereinafter referred to as "maturity") which should be accomplished to achieve the deal.

(1) Stage for Making Connection (actions for getting in contact with new customers, including a visit to the new customers);

(2) Stage for Making Relation (actions for keeping in touch with customers, in order to know the important customers);

(3) Stage for Examining Considerable Matters (actions for researching any matters which may have some influence on a contract to be made with the customer, such as an action for researching about a completing company(ies) or equipment currently-possessed by the customer);

(4) Stage for Providing Something to Attract Customer (actions for providing something to meet the desire of the customer);

(5) Stage for Understanding Needs of Customer (actions for researching contents of product demanded by the customer);

(6) Stage for Picking Up Matters to be Solved (actions for picking up matters to be solved in order to successfully provide the product demanded by the customer);

(7) Stage for Formal Proposal (actions for proposing contract for supplying product demanded by the customer);

(8) Stage for Clearing Factors Which May Obstruct Customer to Make Contract (actions for cleaning up any factors which may obstruct the customer to make a contract); and (9) Stage for Entering into Contract.

Each maturity plan is classified into any one of the above nine stages. The more the stage increases, i.e. from (1) to (9), the more the level of maturity increases as well (i.e. reaching to the success in the deal (transaction)).

The information (G) representing the maturity plan corresponding one of the nine stages of maturity includes activity list information, maturity form information, maturity item information, and check flag information. The activity list information (a list of activities) represents specific contents of activities for accomplishing the level of maturity and a planned date for the activities. The maturity form information (maturity form) represents a scheduled date for accomplishing the level of maturity. The maturity item information describes a maturity item which represents an aspect from which it is determined whether the level of maturity is accomplished. The check flag information represents whether the aspect represented in the maturity item of the corresponding transaction is fulfilled. However, each transaction may have a kind of the maturity without any maturity plan.

The customer database 10 stores information (H) representing the credibility of customers, in association with the customers lacking in credibility as judged by the sales staff, The information (H) includes information, representing whether a deal can be made with a corresponding customer and iniformation, suggesting not to have a deal with the corresponding customer even if it is possible.

The customer database 10 stores, in association with each transaction, information (1) representing a person or group competing with the manager of this SFA system in a deal.

The customer database 10 stores information (J) representing a corresponding staff, contents of a plan, and results of activities for the plan without association with any particular customers. The customer database 10 stores, in association with the information (A) of a corresponding customer, information (K) representing a plan and results of activities without association with any particular transactions and done for a particular customer and information (L) representing a scheduled date for completing a scenario describing ideas for enhancing the level of maturity in association with a deal to be made with the particular customer. Further, the customer database 10 stores, in association with the information (L) and the information (A), information (M) representing a combination of the scenario and the scheduled date on which the scenario should be completed.

The customer database 10 stores a "non-scenario" flag, an "scenario-reviewed" flag, a "delay scenario" flag, a "non-maturity plan" flag, a "non-reviewed maturity plan" flag, a "maturity completion" flag, and a "maturity delay" flag, as will be explained later. The customer database 10 updates a status of each of the flags, i.e. sets or resets each of the flags.

The SFA server 1 carries out a process for searching for and updating the customer database 10, in response to a request from any one of the sales-staff terminals 2-1 to 2-n. The SFA server 1 acts as the SFA system, for the requested terminal. In this case, the WWW server program 11, the CGI 12 for SFA tool, and the SFA tool program 13 run on the SFA server 1.

The WWW server program 11 is for receiving an access request from any one of the sales-staff terminal 2-1 to 2-n or manager terminal 3, and for sending a result showing processing done by the SFA server in accordance with the received access request, to the accessing terminal. That is, if any one of the sales-staff terminals 2-1 to 2-n or manager terminal 3 specifies a URL (Uniform Resource Locator) indicating the CGI 12 for SFA tool and sends an access request for a Web page to the SFA server 1, the WWW server program 11 receives this access request. Subsequently, the WWW server program 11 activates the CGI 12, and provides the CGI 12 with data representing the operational contents of the accessing terminal. Then, the WWW server program 11 sends the result sent from the CGI 12, to the accessing terminal.

The CGI 12 is an interface program between the WWW server program 11 and the tool program 13. Upon reception of the data representing the operational contents of the accessing terminal from the WWW server program 11, the CGI 12 converts the received data in an interface format of the SFA tool program 13, calls the SFA tool program 13, and provides the converted data thereto. The CGI 12 receives the result of the processing done in accordance with the data, from the SFA tool program 13, converts data of the processing result into a Web page description format, such as HTML (Hypertext Markup Language), and provides the WWW server program 11 with the converted data.

The SFA tool program 13 is a program serving as the SFA system to be provided to any one of the sales-staff terminals 2-1 to 2-n or manager terminal 3. If the SFA tool program 13 is called from the CGI 12 and receives the data representing the operational contents of the accessing terminal, it executes various processes including the operations of the customer database 10 based on the received data so as to serve as an SFA tool, and sends results of the various processes to the CGI 12.

The above-described operations of the SFA server 1 are common operations of the SFA server 1. Hence, if not necessary in particular, operations of the WWW server program 11, CGI 12 and SFA tool program 13 will not separately be described. Instead, such operations will be described as the operations of the SFA server 1 as a whole.

Each of the sales-staff terminals 2-1 to 2-n is a terminal which is operated mostly by the sales staff to perform the business activities. Each of the sales-staff terminals 2-1 to 2-n includes a personal computer, etc. serving as a client device. The sales-staff terminals 2-1 to 2-n and manager terminal 3 respectively include display devices 2A-1 to 2A-n and 3A each having a liquid crystal display etc. and input devices 2B-1 to 2B-n and 3A each having a keyboard or mouse, etc. The sales staff registers, in the customer database 10, information representing target customers and business transactions and/or information representing plans and results (maturity plan) of the business activities regarding each corresponding business transaction, in accordance with their business activities. Also, the sales staff refers to the registered information, and makes plans for business activities to be processed.

A WWW browser runs on each of the sales-staff terminals 2-1 to 2-n. The operator of each of the sales-staff terminals 2-1 to 2-n operates the WWW browser, and accesses the SFA server 1 so as to operate the above-described customer database 10.

If the operator of a particular sales-staff terminal specifies a URL of the SFA server 1, the WWW browser of the sales-staff terminal accesses the SFA server 1. In the accessed SPA server 1, the WWW server program 11 sends data representing a predetermined Web page to the corresponding sales-staff terminal, for displaying the Web page on the terminal. Further, the operator of the accessing terminal specifies a URL of the CGI by inputting the URL of the CGI 12 or clicking on a certain point of the Web page which is linked to the CGI 12. Upon this, the WWW server program 11 activates the CGI 12. When the SFA server 1 is accessed upon specification of the URL of the SFA server 1 by the sales-staff terminal, the WWW server program 11 may automatically activate the CGI 12.

Operations of the SFA server 1 and sales-staff terminal 2-k will now specifically be explained with reference to FIGS. 4 to 14, in the case where the sales staff operates the sales staff terminal 2-k and where the CGI 12 is activated upon operation of the sales staff terminal 2-k.

Figure 4:
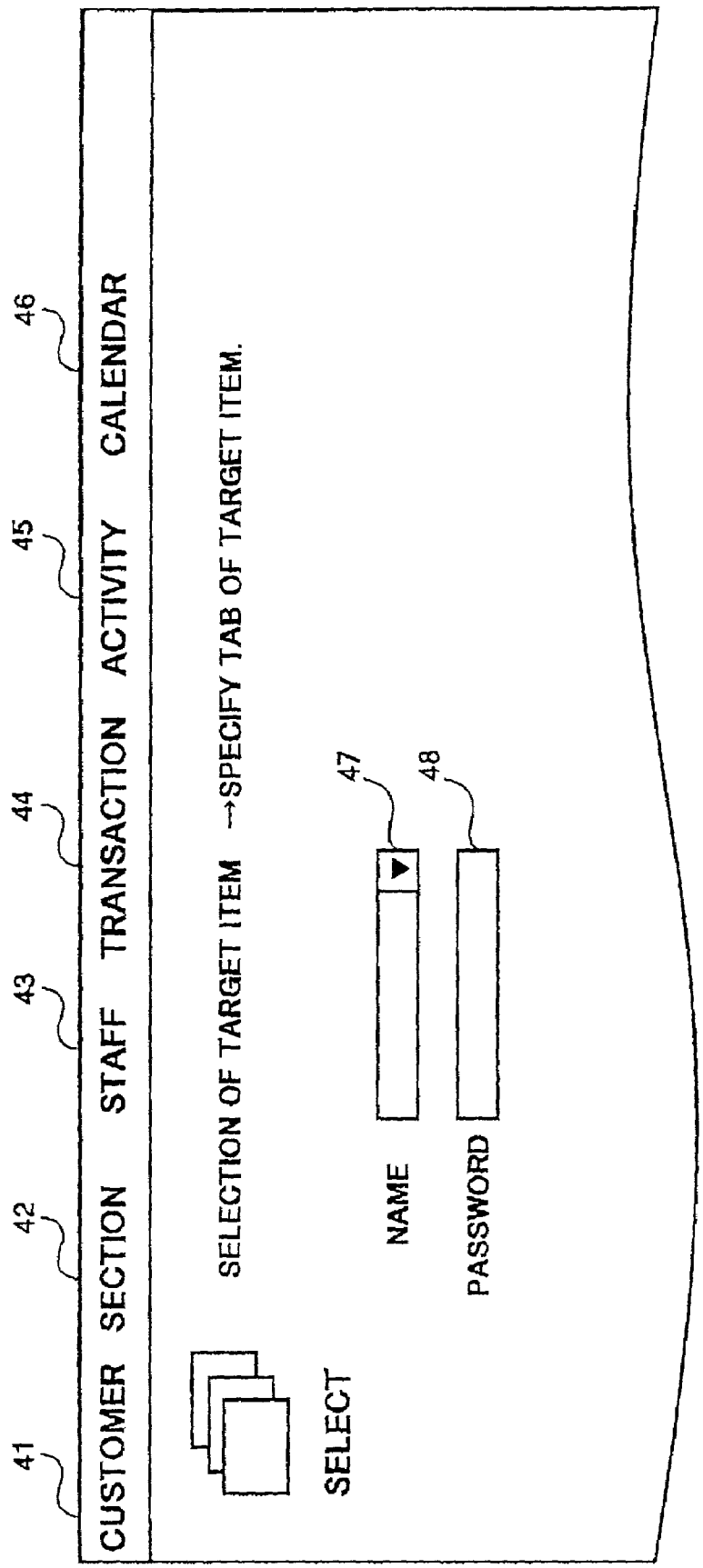
FIG. 4 is a diagram showing a selection page to be displayed on a sales-staff terminal included in the SFA system of FIG. 1.

FIG. 4 is a diagram showing a schematic image of a selection page. The SFA server 1 sets the sales-staff terminal 2-k to display the selection page for specifying a target item to be operated. That is, in the SFA server 1, the activated CGI 12 provides the WWW server program 11 with data representing a Web page of the selection page. The WWW server program 11 provides the sales-staff terminal 2-k with the received data. The WWW browser of the sales-staff terminal 2-k displays the selection page represented by the data supplied from the SFA server 1, on the display of the display device 2A-k included in the sales-staff terminal 2-k.

On various pages shown in the drawings for illustrating the embodiment of the present invention, those sections (parts) which are not directly related to the descriptive part of the present invention will not or just briefly be explained in this specification. Of course, each of those pages has a GUI (Graphical User Interface) included in a PC which is generally employed in the sales-staff terminals and/or manager terminal.

As illustrated in FIG. 4, the selection page includes six tabs 41 to 46 which are set in one-to-one correspondence to items of "Customer", "Section", "Staff" (a corresponding staff to contact with), "Transaction", "Activity", and "Calendar", respectively. The selection page serves as a page for authenticating a user of the SFA server 1, and has boxes 47 and 48 for inputting his/her user name and password. The box 47 for inputting the user name is in a pull-down menu form. If the operator clicks on an arrow on the right part of the box 47, the registered user name is displayed in a pull-d,own list form.

After the operator of the sales-staff terminal 2-k selects a corresponding name from the pull-down list displayed in the box 47 and inputs a password in the box 48, the operator may click on one of the six tabs 41 to 46. Upon this, the WWW browser of the sales staff terminal 2-k sends information representing the specified user name and password and the clicked tab to the SFA server 1. After the SFA server 1 verifies that the received user name and password are proper information, it sends data representing a display page corresponding to the tab shown in the received information to the sales-staff terminal 2-k. The WWW browser of the sales-staff terminal 2-k receives the sent data, and displays the display page represented by the received data on the display screen of its display device 2A-k.

When the SFA server 1 receives the information representing the clicked tab, it sets a display page to be newly displayed on the sales-staff terminal 2-k, depending on which one of the six items corresponds to the tab shown in the received information. Then, the SFA server 1 sends Web page data representing the set display page in an HTML form to the sales-staff terminal 2-k.

Figure 5:
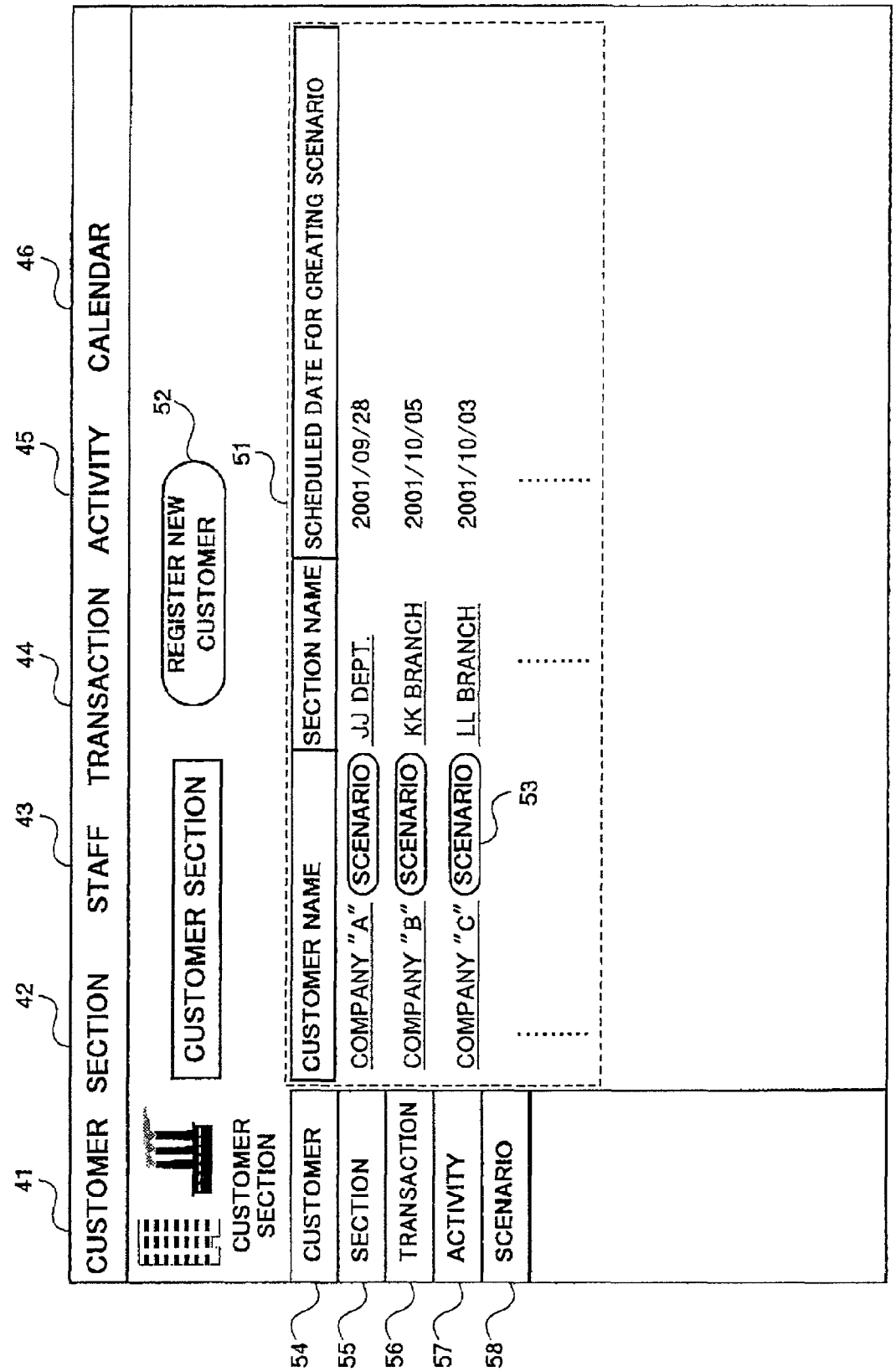
FIG. 5 is a diagram showing a customer-list page to be displayed on the sales-staff terminal.

In the case where the clicked tab corresponds to either one of the items of "Customer", "Section", or "Staff to Contact With", the display page to be displayed on the sales-staff terminal 2-k under the control of the SFA server 1 includes a list of target "Customer", "Section", or "Staff". FIG. 5 is a diagram showing an example of a customer list page which is shown in the case where the tab 42 corresponding to the item of "Section" is clicked on. As shown in FIG. 5, the customer list page includes a customer list 5l. The customer list may be created in such a manner that the SFA server 1 searches the customer database 10 for the information of (A), (B), or (C), and creates HTML form data representing a display page showing customer name(s), section name(s) or staff name(s) shown in the searched information. As shown in FIG. 5, the customer list page includes, on its left side, five views 54 to 58 of "Customer", "Section", "Transaction", "Activity(ies)", and "Scenario".

In FIG. 5, if the name of each item of "Customer", "Section", or "Staff to contact with" is underlined, the name is set in the form of a hyperlink. Through this hyperlinTk, the information representing the customer name, section name, or staff name is connected to a list of transactions in association with each other. Hence, if the operator of the sales-staff terminal 2-k clicks on a customer (organization) name, section name, or staff name included in their corresponding list displayed on the display page, the SFA server 1 displays a display page including a list of business transactions in association with the clicked name on the sales-staff terminal 2-k. That is, the SFA server 1 searches the customer database 10 for the above-described information (F), and reads out information corresponding to the clicked name included in the information (F). Then the SFA server 1 creates HTML data representing a display page including the business transactions shown in the read information.

Figure 6:
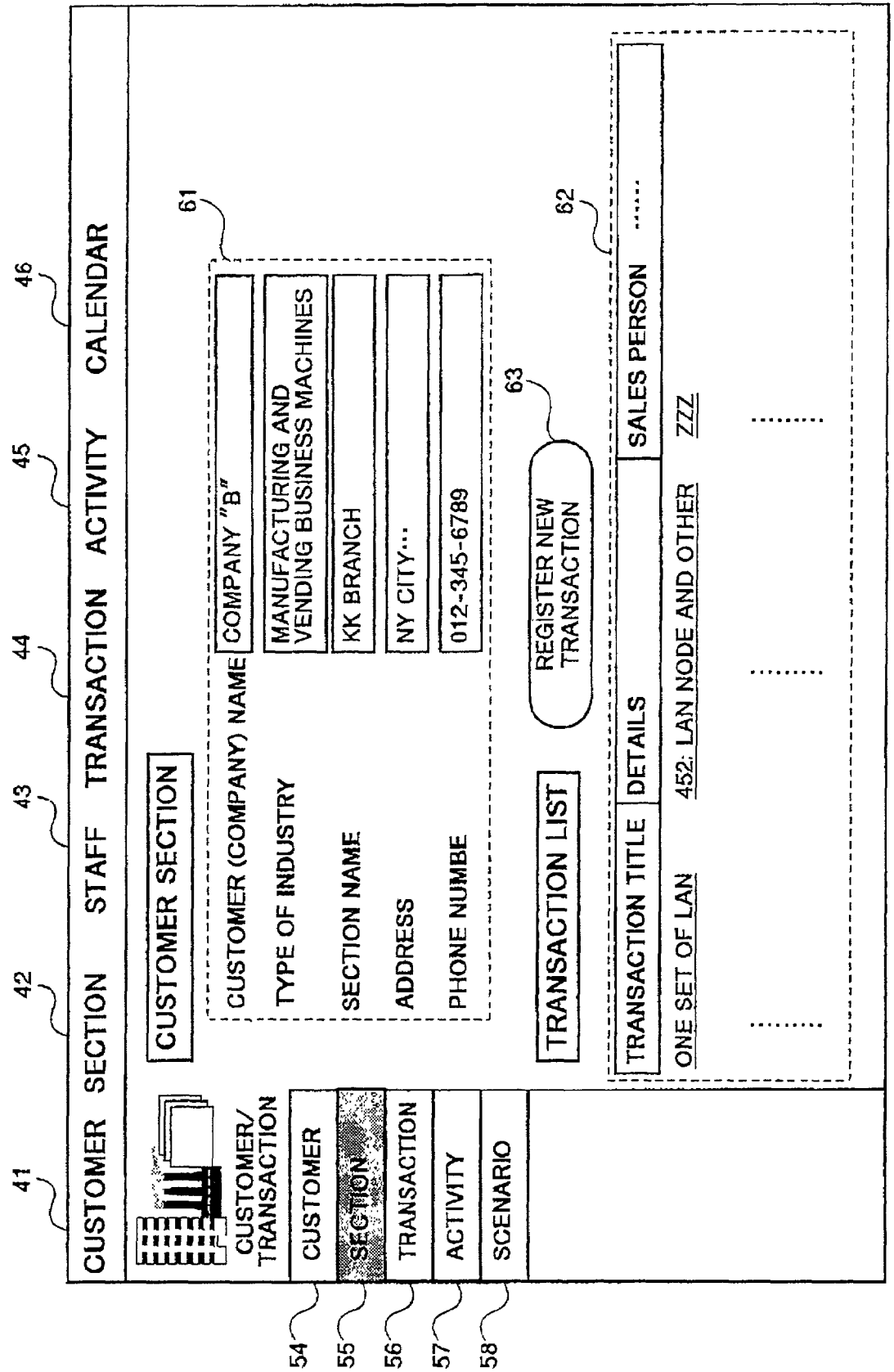
FIG. 6 is a diagram showing a transaction list pave (by customer) to be displayed on the sales-staff terminal.

FIG. 6 is a diagram showing a transaction list page (by customer) which is displayed on the sales-staff terminal 2-k in the case where the operator of the sales-staff terminal 2-k clicks on an item name "AA branch" of the customer (company "B") listed in the second line of the customer list page shown in FIG. 5. As illustrated in FIG. 6, displayed on the transaction list page (by customer) are information 61 regarding the customer and section together with a transaction list 62 of the section.

As shown in FIG. 6, the transaction list page according to customer includes a "New Registration" button 63 for newly registering a transaction, in addition to the five views 54 to 58 of "Customer", "Section", "Transaction", "Activity(ies)", and "Scenario". If the operator clicks on the "new registration" button on the transaction list page, the SFA server 1 sets the sales-staff terminal 2-k to display a later-described transaction registration page.

On the customer list page shown in FIG. 5, instead of clicking on any of the items of "Customer", "Section", or "Staff to Contact With", the operator may specify the line of the customer in the customer list, and click on the view 56 of "Transaction" on the left hand side of the page, thereby succeeding in shifting to the transaction list page shown in FIG. 6.

As shown in FIG. 5, the page for displaying the list of customers further includes a "Register New Customer" button 52 for newly registering a customer. If the operator of the sales-staff terminal 2-k clicks on this "New Registration" button, the SFA server 1 sets the sales-staff terminal 2-k to display a customer-information-registration page for registering information regarding a new customer.

Figure 7:
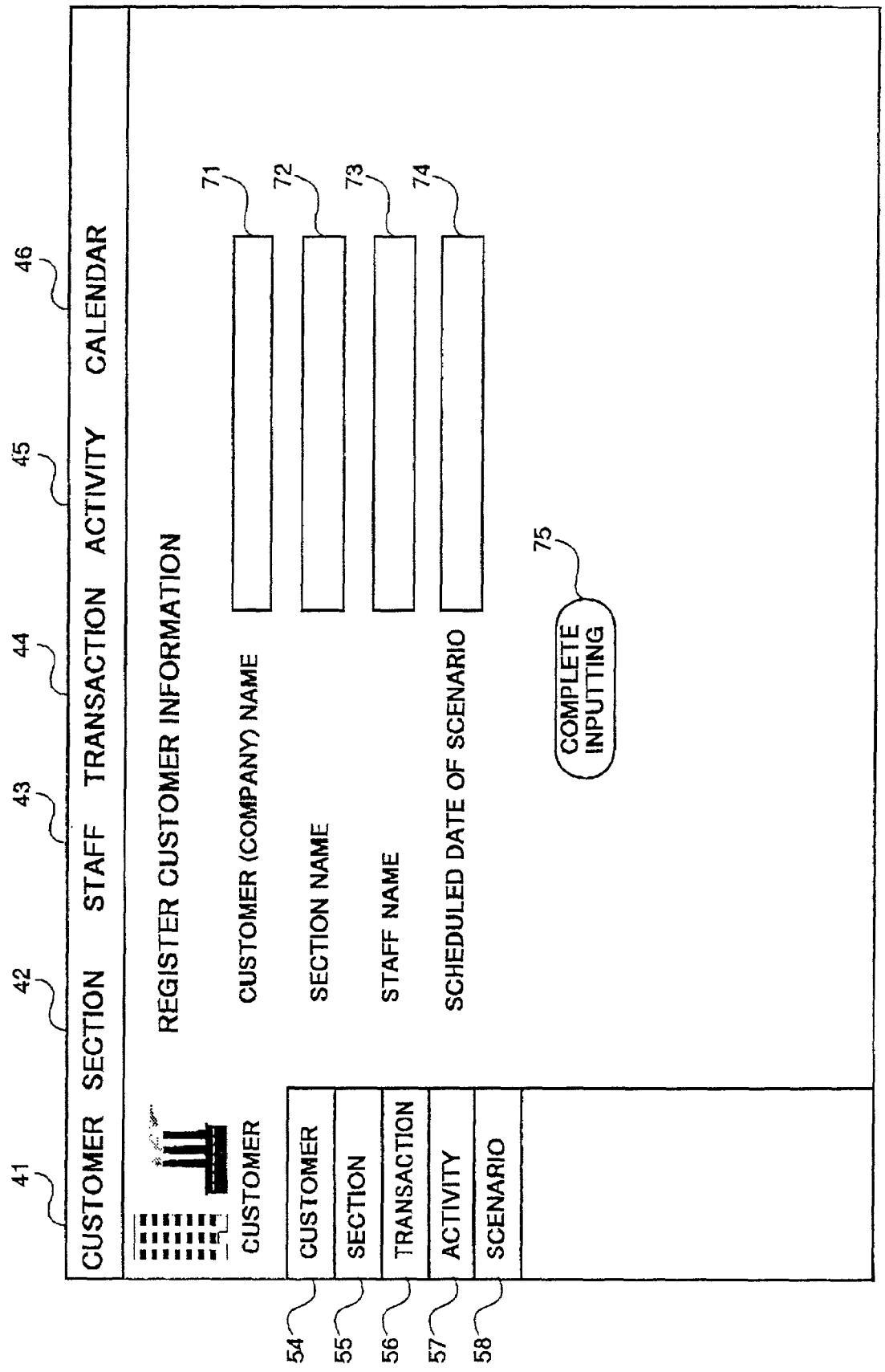
FIG. 7 is a diagram showing a customer-information registration page to be displayed on the sales-staff terminal.

FIG. 7 is a diagram showing the customer-information registration page. As illustrated in FIG. 7, the customer-information registration page includes four text boxes 71 to 74 for inputting respectively "Customer" representing a name of a customer to newly be registered, "Section", "Staff to Contact With", and "Scheduled Date" for creating a strategic scenario for a target customer. The customer-information registration page includes also a "Completion" button 75 for indicating that the inputting is completed.

After the operator inputs required information in each of the text boxes 71 to 74 and clicks on the "Completion" button 75, the sales-staff terminal 2-k sends the input information, i.e. the information representing the customer name, section name, staff name, and scheduled date, to the SFA server 1. Upon this, the SFA server 1 receives the information from the sales-staff terminal 2-k, and registers the information representing the customer name, as the information (A), in the customer database 10. Further, the SFA server 1. registers the information representing the section name, staff name, and scheduled date, as the information (B), (C), and (D) in association with the information (A), in the customer database 10.

In the case where the customer name or scheduled date input in the respective text boxes 71 and 74 have already been registered in the customer database 10, the received information representing the section name and staff name are registered in the customer database 10, as the information (B) and (B).

The customer information (e.g. job information the corresponding customer, address and phone number of the customer, etc.) other than the information (A), (B) and (C), can be retrieved from a generally-prepared company database other than the customer database 10. When displaying the customer information on the transaction list page shown in FIG. 6, the SFA server 1 may simply retrieve necessary information from the company database using a search key, such as the customer name, etc. When registering a new customer, the SFA server 1 may search the company database for some necessary information, and register the searched information in the customer database. Further, the SFA server 1 may imports information, which can not easily be retrieved from the company database, from the customer-information registration page or from any other page, so as to input the transported information.

If the SFA server 1 newly registers the information (A) and information (L) in the customer database 10, it sets a "non-scenario" flag indicating that there is no information (M) (scenario) corresponding to the information (A), in the customer information registered in the customer database 10.

Attached to each of the customer names included in the list of customers is a scenario button 53 for registering the strategic scenario. If the operator of the sales-staff terminal 2-k clicks on the scenario button 53, the SFA server 1 sets the sales-staff terminal 2-k to display a page for registering the strategic scenario.

The page (not illustrated) for newly registering the strategic scenario includes: two text boxes for inputting a pathname (e.g. directly name, file name, and the like) of the scenario to be newly registered the scheduled date on which the scenario should be completed; and a "Completion" button for indicating that the inputting is completed.

The strategic scenario is created using, for example, a general spread sheet program. The operator of the sales-staff terminal 2-k executes a program for creating the scenario, inputs the strategic scenario, and creates a file describing the strategic scenario. Subsequently, the operator inputs the pathname and scheduled date of the created file in a corresponding text box of the above-described page for registering the scenario, and clicks on the "Completion" button. Then, the sales-staff terminal 2-k sends a file of the input pathname and the input scheduled date, to the SFA server 1.

Upon reception of the sent file, the SFA server 1 adds the file and scheduled date in the customer database 10, as the information (M). At this time, the information (M) is stored in the customer database 10, in association with the information (A) representing the customer name having a "new registration" button attached thereto.

If the SFA server 1 newly adds the information (M) in the customer database 10 in association with the information (A) (customer name), it resets a "non-scenario" flag representing that there is no strategic scenario corresponding to the information (A).

The SFA server 1 specifies any customer(s) for whom the strategic scenario has not been created even after the scheduled date specified in the information (L), of the entire customers registered in the customer database 10, based on the present date and time specified in the date/time information sent by the timer 1C. The SFA server 1 sets a "delay-scenario" flag representing that the strategic scenarios respectively for the specified customers are delayed being created.

Figure 8:
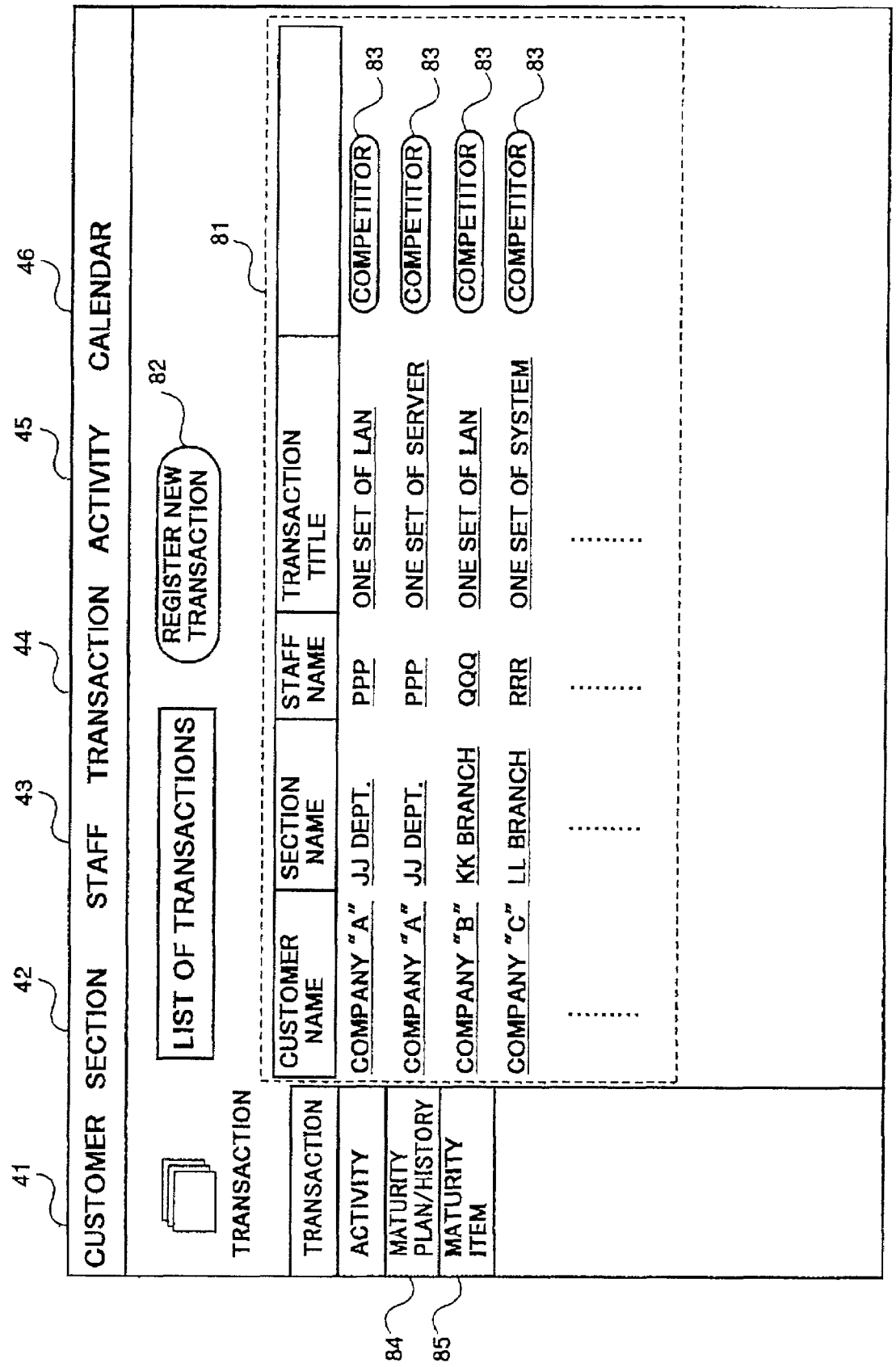
FIG. 8 is a diagram showing a transaction list page to be displayed on the sales-staff terminal.

In the case where the operator clicks on a tab corresponding to the item of "Transaction" in the selection page of FIG. 4, the page which the SFA server 1 sets the sales-staff terminal 2-k to display includes a list of entire business transactions. FIG. 8 is a diagram showing a transaction-list page having this list of entire business transactions. As illustrated in FIG. 8, the transaction-list page includes a transaction list 81, for example. The transaction list can be created in such a way that the server SFA 1 retrieves the information (A), (B), (C), and (F) from the customer database 10 and creates an HTML data representing a page showing, several transactions represented in the retrieved information.

Further, as shown in FIG. 8, the transaction-list page includes a "New Registration" button 82 for newly registering a business transaction. If the operator clicks on the "New Registration" button on the transaction-list page, the SFA server 1 sets the sales-staff terminal 2-k to display a later-described transaction registration page.

The transaction list displayed on the transaction-list page of FIG. 8 includes a "Competitor" button 83 for newly registering information representing a competitor of each business transaction. If the operator of the sales-staff terminal 2-k clicks on this "Competitor" button 83, the SFA server 1 sets the sales-staff terminal 2-k to display a page for inputting the information representing a competitor of each business transaction.

A page (not illustrate) for inputting the information representing the competitor includes a text box for inputting a competitor name and a "Completion" button for indicating that the inputting of information is completed.

The operator of the sales-staff terminal 2-k inputs the competitor name in the text box, and clicks on the "Completion" box. Then, the sales-staff terminal 2-k sends the input competitor name to the SFA server 1. Upon reception of the sent competitor name, the SFA server 1 adds the competitor name in the customer database 10, as the information (I). Note that the information (I) is stored in the customer database 10, in association with the information (F) representing the business transaction corresponding to the clicked competitor button attached thereto.

In FIG. 8, if the name of the business transaction shown on the transaction-list page is underlined, the name is set in the form of a hyperlink. If the operator of the sales-staff terminal 2-k clicks on an arbitrary one of the business transactions, the SFA server I sets the sales-staff terminal 2-k to display a maturity plan/history page for displaying a list of maturity items corresponding to the clicked transaction.

Figure 9:
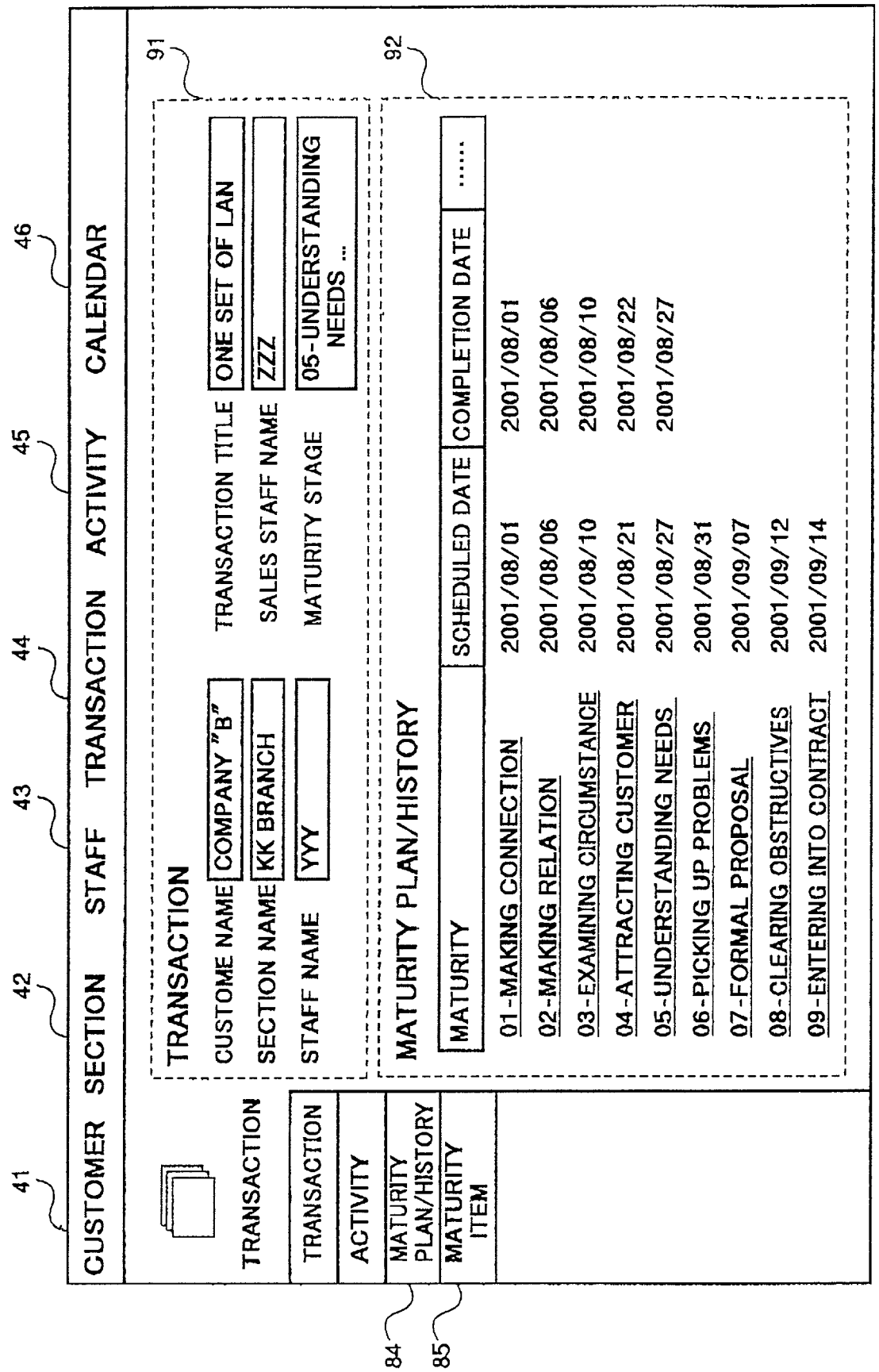
FIG. 9 is a diagram showing a maturity plan/history page to be displayed on the sales-staff terminal.

On the transaction-list page shown in FIG. 8, instead of clicking on the business transaction, the operator may specify the corresponding line of the transaction on the page, and. click on the view 843 of "Maturity Plan/History" on the left hand side of the page, thereby succeeding in shifting to the maturity plan/history page shown in. FIG. 9.

FIG. 9 is a diagram showing a maturity plan/history page. As shown in FIG. 9, the maturity plan/history page includes information 91 regarding a target business transaction and a maturity plan/history 92 of the transaction. The maturity plan/history 92 shows the nine stages of the maturity plan, scheduled dates for completing the respective nine stages, and completion dates on which the respective nine stages are actually achieved. In FIG. 9, if the name of each stage is underlined, the information corresponding to underlined stage name is set in the form of a hyperlink. If the operator of the sales-staff terminal 2-k clicks on an arbitrary maturity stage included in the maturity plan/history 92, the SFA server 1 retrieves information regarding the maturity item corresponding to the clicked maturity stage from the customer database 1.0, and sets the sales-staff terminal 2-k to display a maturity item page for displaying the retrieved information.

Figure 10:
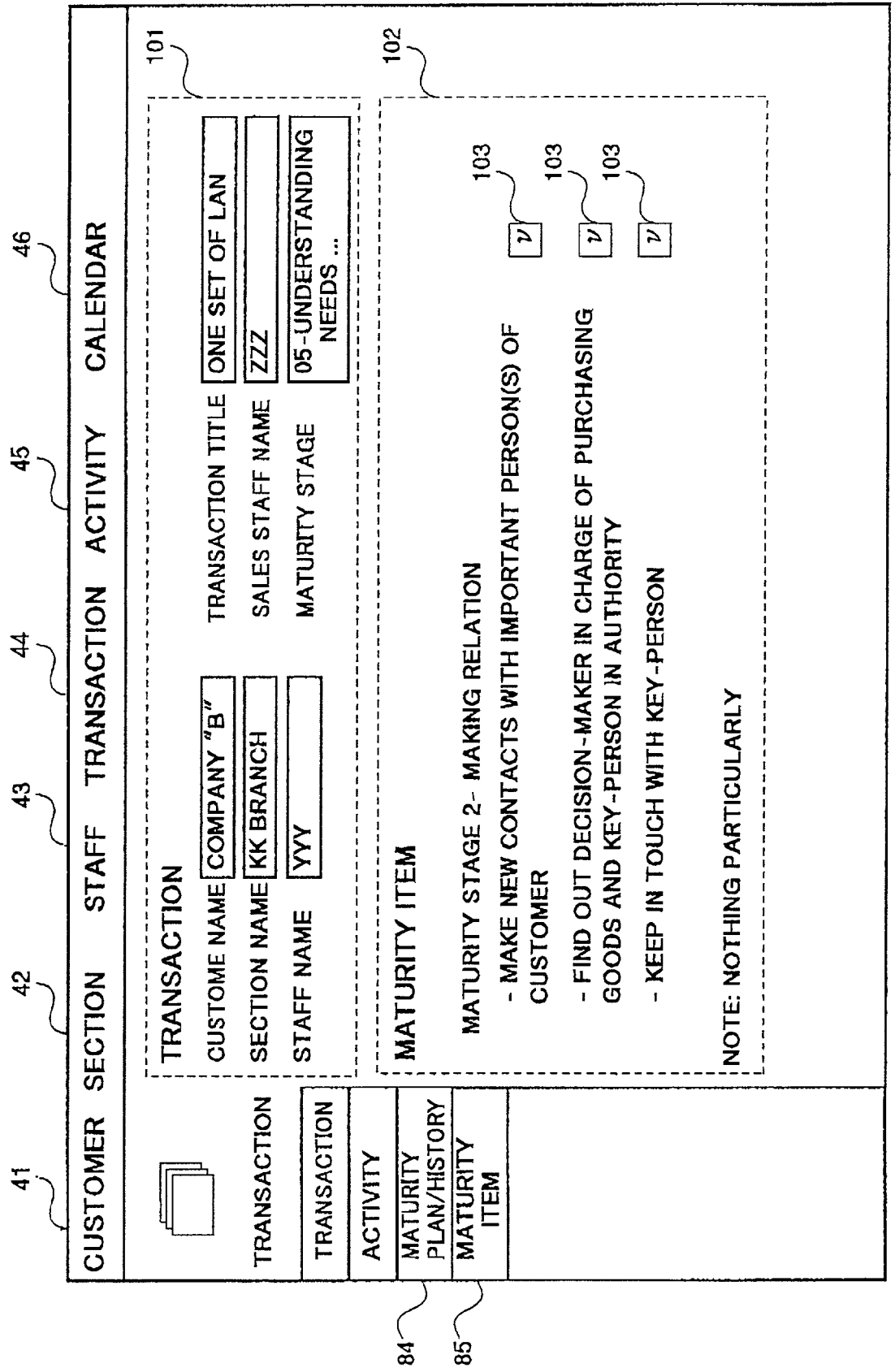
FIG. 10 is a diagram showing a maturity item page to be displayed on the sales-staff terminal.

FIG. 10 is a diagram showing the maturity item page. As shown in FIG. 10, the maturity item page includes information 101 regarding a target business transaction and information 102 regarding a maturity item corresponding to the clicked maturity stage. The information 102 includes a maturity item representing some aspects based on which it is determined whether a corresponding maturity stage is accomplished. Further, the maturity item page includes some check boxes 103 showing whether each corresponding maturity stage is accomplished.

If the operator of the sales-staff terminal 2-k selects on an arbitrary check box, the sales-staff terminal 2-k sends information representing that the corresponding check box has been marked. Upon reception of the information. representing that the corresponding check box has been marked, the SFA server 1 stores the completion date and received information in the customer database 10. When displaying the maturity item. page on the sales-staff terminal 2-k, the SFA server 1 sets the sales-staff terminal 2-k to show a check mark in the check box of the maturity item corresponding to the information, representing that the aspects of the maturity item are accomplished and stored in the customer database 10.

Based on the present date and time shown in the date/time information generated by the timer IC, the SFA server 1 examines the accomplishment level of each maturity stage for all the transactions stored in the customer database 10, and stores an examination result in the customer database 10. That is, the SFA server 1 specifies whether there is a maturity stage corresponding to an unchecked check box even the scheduled date has passed. After this, the SFA server 1 sets a "maturity delay" flag representing that the specified maturity stage is delayed being accomplished. If there is no maturity stage corresponding to an unchecked check box, i.e. if all check boxes are marked, the SFA server 1 sets a "maturity completion" flag. When displaying the maturity plan/history page shown in FIG. 9 on the sales-staff terminal 2-k, the SFA server 1 sets information representing that the maturity stage is delayed being accomplished, in the column of the completion date, if the "maturity delay" flag is set. In addition, the SFA server 1 sets the last date of the completion dates respectively corresponding to the maturity stages, if the "maturity completion" flag is set.

When displaying the maturity item page on the sales-staff terminal 2-k, the SFA server 1. displays also a message for suggesting to check a check box.

In the state where there is a check box which has not yet been checked, of check boxes of a predetermined maturity stage to be displayed, the operator may click on a maturity stage at a higher level than the level of the maturity stage of the unchecked check box. In this case, the SFA server 1 sets the sales-staff terminal 2-k to display a "action ( ) selection" message for requesting to select some process in relation to a checked check box and unchecked check box.

Specifically, the contents of the message are to ask the operator to select one process of the following actions of:

(A) handling, as a checked box, an unmarked check box of a maturity item corresponding to a maturity at a level lower than a level of another maturity to be displayed on the sales-staff terminal 2-k;

(B) leaving the unmarked check box as is, so as to mark the check box later on, and handling, as an effect data, the input result of the check box of the maturity item corresponding to the another maturity to be displayed; and (C) leaving the unmarked check box of the maturity item corresponding to a maturity at a level lower than a level of the another maturity to be displayed on the sales-staff terminal 2-k, so as to mark the check box later on, and handing, as a non-effective data, the input result of the check box of the maturity item corresponding to the another maturity to be displayed.

If the operator of the sales-staff terminal 2-k selects either one of the above actions of (A), (B), (C), the sales-staff terminal 2-k supplies the SFA server 1 with information representing the operator selected action. Then, the SFA server 1 executes a process corresponding to the supplied information.

Though mentioned earlier that the maturity item page shown in FIG. 10 is separated from the maturity plan/history page shown in FIG. 9, the SFA server 1 may display an incorporated page of FIG. 10 in combination with the page of FIG. 9 on the sales-staff terminal 2-k. The incorporated page includes the information 102 showing the maturity item specified by the operator, in addition to the information 91 and maturity plan/history 92.

On the selection page of FIG. 4, in the case where the tab selected by the operator of the sales-staff terminal 2-k corresponds to "Activity", the page which the sales-staff terminal 2-k displays is to show a list of information regarding all activities included in the maturity plans of the entire business transactions. A transaction title, a customer name, and a section name are affixed to the activity information, in association with each item of the activity information included in the list.

FIG. 11 is a diagram showing an activity-list page. As shown in FIG. 11, the activity-list page shows a list of activity information sets included in the maturity plans of the entire business transactions, according to scheduled dates of the activities.

Activity information 11 shown on the activity-list page includes: details of each activity, the maturity of the activity, scheduled date and time of the activity, customer name, section name of customer's organization, and transaction title, in association with each other. Further, a text box for inputting the date on which the activity shown in the activity list was actually held is affixed to each activity information set shown in the list.

In the case where a predetermined activity is held not for a particular target customer (or for a particular business transaction), the column of the corresponding customer name (or transaction title) is left blank.

The SFA server 1 searches the customer database 10 for the above-described information (A) and (B) and the activity information included in the information (G), so as to acquire the activity information to be shown on the activity-list page. After this, the SFA server 1 specifies how the searched activity information is classified according to the maturity. The SFA server 1 creates HTML data representing a page having the searched activity information, transaction title, customer name, section name, maturity, and text box. In addition, the SFA server 1 sends the created data to the sales-staff terminal 2-k to display the data thereon.

If a customer name and a section name included in the information regarding each activity and shown on the activity-list page are underlined and shown on the activity-list page, the information representing the names are set in the form of a hyperlink for displaying only the activity information regarding its corresponding customer(s) or section. If the operator of the sales staff terminal 2-k clicks on an arbitrary one of the customer name and section name, the SFA server 1 sets the sales-staff terminal 2-k to display the activity-list page, showing the activity information including the information (G) in relation to the clicked customer name or section name.

If a transaction title included in the information regarding each activity shown on the activity-list page is underlined, the information representing the transaction title is set in the form of a hyperlink for displaying the maturity plan/history page in relation to the transaction title on the sales-staff terminal 2-k. If the operator of the sales-staff terminal clicks on an arbitrary transaction title, the SFA server 1 searches the customer database for the information (maturity plan) (G) corresponding to the clicked transaction title. Subsequently, the SFA server 1 displays the maturity plan/history page corresponding to the transaction on the sales-staff terminal 2-k.

In the case where the information (maturity plan) (G) in relation to the clicked transaction title is not stored in the customer database 10, the SFA server 1 sets the sales-staff terminal 2-k to display a page for registering the maturity plan of the transaction. The page for inputting the maturity plan includes a plurality of text boxes for inputting the activity information, scheduled completion date, and maturity item, according to maturity. The page includes also a "Completion" button for indicating that the inputting is completed.

If the operator of the sales-staff terminal 2-k inputs the activity information of each maturity, the scheduled completion date, and the maturity item, and clicks on the "Completion" button, the sales-staff terminal 2-k sends all of the input data to the SFA server 1. Upon reception of the activity information, scheduled completion date, and maturity item, the SFA server 1 stores the received information in the customer database 10, as the information (G). Note that the SFA server 1 stores the information (G) in association with the information, regarding the business transaction corresponding to the transaction title clicked on the activity-list page, and included in the information (F) stored in the customer database 10.

Further, after the SFA server 1 stores the information (G) in association with the information (F) in the customer database 10, it resets a "non-maturity plan" flag indicating that the information (G) corresponding to the information (F) does not exist. The SFA server 1 resets also a "non-reviewed maturity plan" flag indicating that the information (G) has not yet been reviewed (examined) by the manager.

The activity-list page includes a "New Activity Registration" button 112 for newly registering a planned activity to be taken place or an already-held activity. If the operator of the sales-staff terminal 2-k clicks on the "New Activity Registration" button 112, the SFA server 1 sets the sales-staff terminal 2-k to display a page for inputting a list of new activities in relation to a particular business transaction.

FIG. 12 is a diagram showing a "New Activity Registration" page. As illustrated in FIG. 12, the "New Activity Registration" page includes three pull-down menu boxes 121, 122 and 123, two text boxes 124 and 125, another pull-down menu box 126, and a "Completion" button. The boxes 121, 122 and 123 are prepared for respectively specifying a customer name of a corresponding activity shown in newly registered activity information, a corresponding section at his/her organization, and a business transaction of the specified customer name. The two text boxes 124 and 125 are prepared for respectively specifying details of the corresponding activity and a scheduled date of the activity. The box. 126 is prepared for inputting the maturity of the activity. The "Completion" button is prepared for indicating that the inputting is completed.

If the operator of the sales-staff terminal 2-k clicks on an arrow on the right hand side of the box 121, a list of customers registered in. the customer database 10 appears. Then, the operator selects a corresponding customer name. Similarly, the operator clicks on an arrow of each of the boxes 122 and 123, so as to specify the corresponding section name and transaction title. Further, the operator inputs the details of the activity and the schedule date respectively in the text boxes 124 and 125. Upon clicking on the arrow of the box 126, a list of maturity stages appears. Then, the operator selects a corresponding maturity stage, and clicks on the "Completion" button 1.27. Upon clicking on the "Completion" button, the sales-staff terminal 2-k sends the specified customer name, section name, transaction title, details of the activity, scheduled date, and maturity stage, to the SFA server 1. Upon reception of the information from the sales-staff terminal 2-k, the SFA server 1 registers the activity information including the details of the activity and the scheduled date, in association with the specified customer name, section name, transaction title, and maturity stage, in the customer database 10.

On the "New Registration Activity" page shown in FIG. 12, the list of customers, which is displayed if the operator of the sales-staff terminal 2-k clicks on the arrow of the box 121, includes an item of "Not For Particular Customer". If the operator specifies this item, the SFA server 1 registers the input activity information in the customer database 10, as information representing an activity for not for particular customers, Similarly, in the case where the operator specifies an item of "Not for Particular Section" and/or "Not for Particular Transaction" included in the lists of the boxes 122 and 123, the SFA server 1 registers the input activity information in the customer database 10, as the activity information not for particular section or activity information not for particular transaction.

In addition to the above, to register the activity information not for particular customer, section, or transaction, a "New Activity Registration" button for registering such activity information may be set on the activity-list page shown in FIG. 11, separately from the "New Activity Registration" button for registering the information regarding the normal activity for a particular customer or particular transaction.

In this case, the activity-list page shown in FIG. 11 includes a "New Activity Registration" button for newly registering an activity not for a particular transaction, together with the "New Activity Registration" information button for registering the information registering the normal activity for a particular customer or particular transaction. If the operator of the sales-staff terminal 2-k clicks on the latter "New Activity Registration" button, the SFA server 1 sets the sales-staff terminal 2-k to display a page for inputting new activity information not for particular customer.

The page for inputting the new activity information not for particular transaction includes two text boxes and a "Completion" box. The two text boxes are for respectively for inputting the detail information of the activity and the scheduled date of the activity. The page also includes a "Completion" button for indicating that the inputting is completed.

If the operator of the sales-staff terminal 2-k inputs the detail information of the activity and the scheduled date of the activity and clicks on the "Completion" button, the sales-staff terminal 2-k sends the input information to the SFA server 1. Upon reception of the information from the sales-staff terminal 21-k, the SFA server 1 registers the received activity information in the customer database 10.

The activity-list page shown in FIG. 11 further includes a "New Transaction Registration" button 113 for newly registering a transaction. If the operator of the sales-staff terminal 2-k clicks on this button 113, the SFA server 1 sets the sales-staff terminal 2-k to display a transaction-registration page.

FIG. 13 is a diagram showing the transaction-registration page. As shown in FIG. 13, the transaction-registration page includes information 131, transaction information 134 to be registered and a "Completion" button 138. The information 131 represents a customer of a transaction to be registered. The "Completion" button 138 is to indicate that the inputting is completed. The customer information 131 is to specify a customer of the transaction to be registered.

In the case where the operator clicks on the button 63 on the transaction list page (by customer) of FIG. 6, the SFA server 1 sets the sales-staff terminal 2-k. to display a corresponding and a section name at the corresponding customer's organization (company, etc.) respectively in the boxes 132 and 133. This is because the transaction list page (by customer) is to show a list page regarding a specified customer.

In the case where the operator clicks on the button 82 on the transaction list page shown in FIG. 8 or where the operator clicks on the button 113 on the activity list page shown in FIG. 11, the SFA server 1 sets the sales-staff terminal 2-k to display the customer names or section names registered in the customer database 10 in the box 132 or 133, in the form of a pull-down list. The operator of the sales-staff terminal 2-k pulls down the box 132 or 133 to specify a customer name or section name in relation to a target business transaction to be registered.

Further, the operator inputs information representing a transaction title, sales-staff name and details of the transaction, in relation to the transaction to be registered respectively in the boxes 135, 136 and 137, and he/she clicks on the "Completion" button 138. Upon this, the sales-staff terminal 2-k sends the specified or input information representing the customer name, section name, transaction title, sales-staff name, and details of the transaction, to the SFA server 1. Upon reception of the information sent from the sales-staff terminal 1, the SFA server 1 checks that the received customer name and section name are registered in the customer database 10, and registers the received information. representing the transaction title, sales-staff name and details of the corresponding transaction in the customer database 10, in association with the received customer name and section name. At this time, the SFA server 1. sets a "non-maturity plan" flag indicating that there is no information of the maturity plan corresponding to the registered transaction information.

In the case where the operator of the sales-staff terminal 2-k specifies that there is no need to create the maturity plan, the sales staff terminal 2-k provides the SFA server 1, with "non-planned-transaction information" indicating that the operator has thus specified, together with the transaction information regarding the input transaction title. When registering thus provided transaction information together with the non-planned-transaction information in the customer database 10, the SFA, server 1 sets a "non planned" flag indicating that the maturity plan information corresponding to the registered transaction information is not necessary.

On the selection page shown in FIG. 4, in the case where the tab clicked by the operator of the sales-staff terminal 2-k corresponds to the item of "Calendar", the SFA server 1 sets the sales-staff terminal 2-k to display a page. This page shows, in the form of a calendar, information regarding activities included in the maturity plans of the entire transactions that the operator of the sales-staff terminal 2-k, i.e. the corresponding sales staff, is in charge of. This calendar may be a daily calendar, weekly calendar or monthly calendar.

FIG. 14 is a diagram showing a monthly calendar page. As shown in FIG. 14, various activity information sets in the calendar are underlined. This means that the information sets are in a hyperlink form so as to be linked to detail information regarding the activities. If the operator of the sales-staff terminal 2-k clicks on an arbitrary one of the activity information sets, the SFA server 1 sets the sales-staff terminal 2-k to display the detail information of a corresponding activity. A box 141 included in the calendar is prepared for specifying a sales staff name, and shows registered sales staff names in the form of a pull-down list. Usually, an operator of the sales-staff terminal 2-k is permitted to specify only the sales staff name that has been input on the selection page shown in FIG. 4. If the operator pulls down the box 141 and specifies a staff name other than the input name, the sales-staff terminal 2-k sends the specified name to the SFA server 1. However, the SFA server 1 ignores the specified name, and continues to display the same calendar page on the sales-staff terminal 2-k.

On the monthly calendar page shown in FIG. 14, if the operator of the sales-staff terminal 2-k clicks on a view of "Activity" 142 on the left hand side of the page, the SFA server 1 sets the sales-staff terminal 2-k to display activity information of a corresponding month, in the form of the activity-list page shown in FIG. 11.

The manager terminal 3 is operated by the manager of the sales section, for managing the activities of the sales staff. For example, the manager terminal 3 may be a personal computer, etc. having substantially the same structure as that of the sales-staff terminals 2-1 to 2-n.

The manager terminal 3 carries out substantially the same operations as those of the sales-staff terminals 2-1 to 2-n, by activating the WWW browser installed therein. However, the manager terminal 3 does not have a function for inputting the above-described information (A) to (M), and refers to the information registered in the customer database 10. Hence, it is sufficient that the manager terminal 3 displays a Web page in the HTML format which is sent from the SFA server 1, so that the operator of the sales-staff terminal 2-k checks the information contents displayed thereon and inputs information representing that the operator has checked the information.

If the operator of the manager terminal 3, i.e. the sales manager, etc., operates the terminal 3, the manager terminal 3 and the SFA server 1 operates in the manner described below, in accordance with the operations of the operator.

The operator of the manager terminal 3 is the sales manager who should usually be a boss of the sales staff. The sales manager operates the manager terminal 3 so as to periodically check the sales activities done by his/her followers, and accesses the SFA server 1. Likewise the case of the sales-staff terminal 2-k, the sales manager operates the manager terminal. 3 so activate the WWW browser, and accesses the SFA server 1. Then, the SFA server 1 sets the manager terminal 3 to display the selection page shown in FIG. 4 thereon.

If the sales manager clicks on a tab of "Calendar" on the selection page of FIG. 4 to check the activities of the sales staff on the very day or recent days, the SFA server 1 sets the manager terminal 3 to display the monthly calendar page shown in FIG. 14 or a daily or weekly calendar page. The SFA server 1 selects either one of a daily calendar, weekly calendar or monthly calendar, based on pre-set information or previous selection. If the sales manager specifies a target sales person to be checked, from the pull-down list shown in the box 141 of the calendar page, the manager terminal 3 sends the specified person's name to the SFA server 1. Upon reception of the information representing the specified sales person's name from the manager terminal 3, the SFA server 1 retrieves activity information of the sales person from the customer database 10, and controls the manager terminal 3 to display the retrieved activity information. The sales manager can refer to the activity information of an arbitrary sales person.

If the sales manager click on the activity information on the calendar page to check the detail information of the activity information, the SFA server 1 displays the detail information of the specified activity information on the manager terminal 3. If the sales manager clicks on the view of "Activity" on the calendar page, the SFA server 1 controls the manager terminal 3 to display a list of activities done by the specified sales person in the form of the activity list page shown in FIG. 11. The activity information is displayed in the form of a daily calendar, a weekly calendar or a monthly calendar, in accordance with the calendar page.

The sales manager may click on a particular transaction title of the corresponding activity information on the displayed page, to check the activities done or to be done by the sales staff in relation to a concerned transaction included in the activity information displayed on the activity list page. Upon this, the manager terminal 3 sends the clicked transaction title to the SFA server 1, and the SFA server 1 sets the manager terminal 3 to display a maturity plan/history page of the corresponding transaction. The sales manager check the work context of the corresponding transaction on the maturity plan/history page displayed on the manager terminal 3, and clicks on a target maturity name of a maturity so that the sales manager can check the maturity level thereof according to each maturity. Then, the SFA server 1 having received information representing the clicked maturity name from the manager terminal displays a maturity item page of the specified maturity, on the manager terminal 3.

The sales manager checks the attainment level of the maturity item by maturity and the progress of the entire business transactions, based on the information contents displayed on the maturity plan/history page and maturity item page, thereafter inputting information representing that the review of the corresponding maturity plan has been completed. Then, the manager terminal 3 sends the review-completion information to the SFA server 1. Upon reception of the review completion information, the SFA server 1 resets a corresponding "non-reviewed maturity plan" flag in the customer database 10, so as to indicate that the information (G) representing the shown maturity plan has been reviewed.

If the sales manager clicks on the view "Scenario" 58 in the state where the customer information is selected on the customer list page shown in FIG. 5, the SFA server 1 controls the manager terminal 3 to display information (representing a path name of a file described in a strategic scenario and the date the scenario is created) regarding the strategic scenario for the corresponding customer. If the sales manager completely reviewed the strategic scenario inputs information representing about the completion of the scenario, the manager terminal 3 sends information representing that the strategic scenario has completely reviewed to the SEA server 1. Upon reception of this information from. the manager terminal 1, the SFA server 1 sets an "scenario reviewed" flag in the customer database 10, so as to indicate that the sales manager has completed reviewing the information (M).

In the case where the SFA server 1 sets the manager terminal 3 to display a list of customers, a check box is attached to each of the customer names included in the list. This check box is to show whether a "non-maturity plan" flag is set in association with a corresponding customer. If the sales manager clicks on the check box indicating that the "non-maturity plan" flag is set, the manager terminal 3 sends information, to the SFA server 1, representing that it is necessary to make a maturity plan for the customer corresponding to the marked check box. Upon reception of the information from the manager terminal 3, the SFA server 1 resets the "non-maturity plan" flag for the customer(s) corresponding to the marked check box.

The SCM server 4 comprises a processor 4A and a storage section 4B. The processor 4A includes a CPU, etc., and carries out later-described processes. The storage section 4B is connected to the processor 4A, and includes a hard disk device or a RAM, etc.

The SCM server 4 estimates the demand for each kind of products to be manufactured, and outputs an estimated result in response to external accessing (an external response). The SCM server 4 determines a number of each kind of products to be ordered, based on the estimated result of the demand and the amount of stock (or estimated amount of stock) of each kind of products. Then, the SCM server 4 outputs an estimated number of products to be ordered, in response to external accessing.

Specifically, the SCM server 4 estimates the demand for a kind of products, based on a status of a check flag included in the information (maturity plan) (G) registered in the customer database 10 which the SFA server 1 stores.

In more particular, the processor 4A of the SCM server 4 accesses at predetermined intervals the customer database 10 stored in the storage section 1B included in the SFA server. Every time the processor 4A accesses the customer database 10, it obtains numbers of business transactions registered in the customer database, in groups of transactions each group of which corresponds to the same product code (or product group code) of target products to be sold and each group of which is at the same maturity level attained so far.

The processor 4A calculates a reduction rate of the numbers of business transactions at the same maturity level attained so far, according to each group of transactions corresponding to the same product code (or product group code) of target products to be sold, based on a result of calculations successively done for two times. The processor 4A obtains a value derived by substituting the calculated reduction rate for a predetermined function, thereby determining the demand of products by each group of products having the same product code.

The structure of the SFA system is not limited to the above.

For example, the same server computer may have the functions of the SFA server 1 and SCM server 4. The sales-staff terminal 2-k may have the function of the manager terminal 3. Further, the SFA server or SCM server 4 may act as the sales-staff terminal 2-k or manager terminal 3.

When obtaining the numbers of business transactions, the SCM server 4 may obtain the numbers according to maturity stage of business transactions. For example, the SCM server 4 obtains the number of transactions at the so-far attained maturity stage for "Understanding Needs of Customer" by business transaction corresponding to products of the same product code. At the same time, the SCM server 4 obtains the number of transactions at the so-far attained maturity stage for "Formal Proposal" by business transaction. corresponding to products of the same product code.

The sales-staff terminal 2-k or manager terminal 3 may access the SCM server 4 through a network (and or the SFA server 1), in response to an operation of the operator, and acquire the estimated result of the demand for products and the determination result of the number of products to be ordered, so as to display the acquired information on its display page.

The embodiment of the present invention has been explained above. The sales management system according to this invention can be realized using a general computer system without a dedicated system. therefor.

For example, a program for executing the operations of the above SFA server 1, sales-staff terminals 2-1 to 2-n, manager terminal 3 and SCM server may be stored on a medium (a CD-ROM, a magnetic tape, etc.). The program is installed in a plurality of computers each including a DSU or terminal adapter and being connected with each other through a network, thereby realizing the SFA system that carries out the above-described processes.

Additionally, a program for executing operations of the SFA server 1, sales-staff terminals 2-1 to 2-n, manager terminal 3 and SCM server 4 may be recorded on a medium. The program may be installed in a stand-along computer, thereby realizing the SFA system that carries out the above-described processes.

For example, the program may be posted on a BBS (Bulletin Board System) on a communications circuit and transmitted through the circuit. A carrier wave(s) may be modulated using a data signal representing the program, and a resultant modulated wave may be transmitted to an apparatus. Then, this apparatus may restore the program by demodulating the received wave.

This apparatus activates the program, and executes any other application programs, so as to carry out the above processes, under the control of the OS (Operating System).

In the case where a part of the processes is done by the OS, or where the OS may be a part of the elemental components of the present invention, a program excluding that part may be stored on a recording medium. In such a case as well, according to this invention, a program for executing each of the functions of steps executed by the computer is stored on the recording medium.

The customer database 10 is installed separately from the SFA server 1, and the SFA server may access the customer database 10 through a network. For example, the software of the SFA server 1 is provided by an ASP (an Application Service Provider, etc.), and the customer database 10 may be installed in a computer system of a corporation managing the sales activities at the corporation using the SFA server 1. Otherwise, the software of the SFA server provided by the ASP may be combined with the customer database 19 installed in a data center.

Further, instead of managing the plans and schedules of the sales activities in association with the nine stages of the maturity levels, the SFA server 1. may manage the plans and schedules in association with the number of stages in a manner corresponding to the field contents activities to be managed. When building the sales management system of the present invention, the number of maturity stages and contents of each maturity stage may be defined in the SFA server 1.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-299945 filed on Sep. 29, 2000, and including specification, claims, drawings and summary. The disclosure of the above Japanese Patent Application is incorporated herein by reference in its entirety.

What is claimed is:

1. A sales activity management system, comprising:
   an activity item information storage section which stores a plurality of activity item information sets representing a plurality of activity items included in sales activities for achieving business transactions, in association with a plurality of stages into which the plurality of activity items are classified based on degree of progress toward achieving the business transactions;
   an evaluation information obtaining section which obtains evaluation information representing that the business transactions have progressed to any of the stages, and stores the evaluation information in said activity item information storage section;
   a calculation section which obtains number of business transactions having attained a same stage, according to each group of transactions in which a same product is to be sold, based on a result of calculations successively done for two times;
   a product demand quantity determining section which calculates a reduction rate of the numbers of business transactions which are obtained by said calculation section based on the calculations successively done for two times, and determines a demand quantity of the product based on the calculated reduction rate; and
   a display section which retrieves the activity item information sets and the evaluation information from said activity item information storage section, and displays them,
   wherein said evaluation information obtaining section obtains data representing scheduled performance dates for performing activity items, and stores the data in said activity item information storage section in association with the activity item information sets, said display section retrieves the data representing the scheduled performance dates from said activity item information storage section, and displays the data, said evaluation information obtaining section obtains date information representing a present date, and generates data representing that performance of the activity items is delayed in a case where the date represented by the obtained date information is a date after the scheduled performance dates for performing the activity items, and said evaluation information obtaining section obtains data representing performance dates on which the activity items represented by the activity item information sets are actually performed in accordance with an operation of an operator, and stores the data in said activity item information storage section in association with the activity item information sets.

2. The sales activity management system according to claim 1, wherein said evaluation information obtaining section stores the evaluation information in said activity item information storage section, in a manner that the activity item information sets and the evaluation information are associated with each other, customer by customer.

3. The sales activity management system according to claim 1, wherein in a case where said evaluation information obtaining section obtains the evaluation information regarding a second stage that is higher in the degree of progress of a business transaction than a first stage when said evaluation information obtaining section has not yet obtained the evaluation information regarding the first stage, said display section displays a message for suggesting an operator to make a selection regarding how to handle the evaluation information regarding the first stage or second stage.

4. The sales activity management system according to claim 1, wherein said evaluation information obtaining section generates data representing a scenario of an activity item performed for a customer, and stores the data in said activity item information storage section in association with the customer.

5. The sales activity management system according to claim 1, wherein said display section displays the activity item information sets in a list in which the activity item information sets are arranged in an order of scheduled performance dates represented by the data associated with the activity item information sets.

6. The sales activity management system according to claim 5,
wherein said activity item information storage section stores the activity item information sets in association with customer information representing customers for which the activity items represented by the activity item information sets are to be performed, and when the customer information is pointed to when it is displayed in a list format, said display section retrieves the activity item information set associated with the customer information pointed to, from said activity item information storage section, and displays it.

7. The sales activity management system according to claim 6, wherein said activity item information storage section stores the customer information including information for specifying a person in charge at each customer.

8. The sales activity management system according to claim 6, wherein said evaluation information obtaining section obtains data representing a scenario of an activity item performed for a customer, and stores the data in said activity item information storage section in association with the customer information regarding the customer.

9. The sales activity management system according to claim 8, wherein
said evaluation information obtaining section stores scenario deadline data representing a deadline date by which the data representing a scenario has to be stored in association with the customer information, in said activity item information storage section in association with the customer information, and said evaluation information obtaining section obtains date information representing a present date, and generates data representing that the data representing a scenario has not yet been associated with the customer information, with which the scenario deadline data is associated, in a case where the date represented by the obtained date information is a date after the date represented by the scenario deadline data.

10. The sales activity management system according to claim 5, wherein
said evaluation information obtaining section stores the evaluation information in said activity item information storage section in association with business transactions to be evaluated, and when any of the business transactions is pointed to when they are displayed in a list format, said display section retrieves the evaluation information associated with the business transaction pointed to, from the evaluation information obtaining section, and displays it.

11. The sales activity management system according to claim 3,
wherein in a case where when said display section displays the message and a selection for leaving the evaluation information regarding the first stage unobtained is made, said evaluation information obtaining section determines not to change the evaluation information regarding the first stage.

12. The sales activity management system according to claim 3, wherein in a case where said display section displays the message and a selection for canceling the evaluation information regarding the second stage is made, said evaluation information obtaining section determines to invalidate the evaluation information regarding the second stage.

13. A method for managing sales activities, comprising the steps of:
storing, in a database, a plurality of activity item information sets representing a plurality of activity items included in sales activities for achieving business transactions, in association with a plurality of stages into which the plurality of activity items are classified based on degree of progress toward achieving the business transactions;

obtaining evaluation information representing that the business transactions have progressed to any of the stages, and storing the evaluation information in said database;

retrieving the evaluation information from said database, and obtaining number of business transactions having attained a same stage, according to each group of transactions in which a same product is to be sold, based on a result of calculations successively done for two times;

calculating a reduction rate of the numbers of business transactions which are obtained based on the calculations successively done for two times, and determining a demand quantity of the product based on the calculated reduction rate;

retrieving the activity item information sets and the evaluation information from said database and displaying them on a display device;

obtaining data representing scheduled performance date for performing the activity items represented by the activity item information sets, and storing the data in said database in association with the activity item information sets, retrieving the data representing the scheduled performance dates from said database, and displaying the data on the display device;

obtaining data representing performance dates on which the activity items represented by the activity item information sets are actually performed in accordance with an operation of an operator, and storing the data in said database in association with the activity item information sets; and obtaining date information representing a present date, and generating data representing that performance of the activity items is delayed in a case where the date represented by the obtained date information is a date after the scheduled performance dates for performing the activity items.

14. A computer readable recording medium storing a program for controlling a computer to execute the steps of:

storing, in a database, a plurality of activity item information sets representing a plurality of activity items included in sales activities for achieving business transactions, in association with a plurality of stages into which the plurality of activity items are classified based on degree of progress toward achieving the business transactions;

obtaining evaluation information representing that the business transactions have progressed to any of the stages, and storing the evaluation information in said database;

retrieving the evaluation information from said database, and obtaining number of business transactions having attained a same stage, according to each group of transactions in which a same product is to be sold, based on a result of calculations successively done for two times;

calculating a reduction rate of the numbers of business transactions which are obtained based on the calculations successively done for two times, and determining a demand quantity of the product based on the calculated reduction rate;

retrieving the activity item information sets and the evaluation information from said database and displaying them on a display device;

obtaining data representing scheduled performance dates for performing the activity items represented by the activity item information sets, and storing the data in said database in association with the activity item information sets, retrieving the data representing the scheduled performance dates from said database, and displaying the data on the display device;

obtaining data representing performance dates on which the activity items represented by the activity item information sets are actually performed in accordance with an operation of an operator, and storing the data in said database in association with the activity item information sets; and obtaining date information representing a present date, and generating data representing that performance of the activity items is delayed in a case where the date represented by the obtained date information is a date after the scheduled performance dates for performing the activity items.

* * * * *

UNITED STATES PATENT AND TRADEMARK OFFICE
CERTIFICATE OF CORRECTION

PATENT NO. : 7,155,424 B2  
APPLICATION NO. : 09/964585  
DATED : December 26, 2006  
INVENTOR(S) : Ikezawa et al.

It is certified that error appears in the above-identified patent and that said Letters Patent is hereby corrected as shown below:

On the title page, the Terminal Disclaimer information is incorrect. Item (45) and the Notice information should read as follows:

-- (45) **Date of Patent: * Dec. 26, 2006**

Notice: Subject to any disclaimer, the term of this patent is extended or adjusted under 35 U.S.C. 154(b) by 375 days. --

Signed and Sealed this

Tenth Day of April, 2007

JON W. DUDAS  
*Director of the United States Patent and Trademark Office*